(12) United States Patent
Liu et al.

(10) Patent No.: US 11,991,112 B2
(45) Date of Patent: May 21, 2024

(54) SYMBOL PROCESSING METHOD AND APPARATUS

(71) Applicant: HUAWEI TECHNOLOGIES CO., LTD., Guangdong (CN)

(72) Inventors: Fengwei Liu, Chengdu (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/565,669

(22) Filed: Dec. 30, 2021

(65) Prior Publication Data

US 2022/0123899 A1    Apr. 21, 2022

Related U.S. Application Data

(63) Continuation of application No. PCT/CN2020/095632, filed on Jun. 11, 2020.

(30) Foreign Application Priority Data

Jul. 2, 2019    (CN) .......................... 201910590953.0

(51) Int. Cl.
*H04L 5/00* (2006.01)
*H04L 25/03* (2006.01)
*H04L 27/26* (2006.01)

(52) U.S. Cl.
CPC ...... *H04L 5/0051* (2013.01); *H04L 25/03012* (2013.01); *H04L 25/03343* (2013.01); *H04L 27/2628* (2013.01)

(58) Field of Classification Search
CPC ............. H04L 5/0051; H04L 25/03012; H04L 25/03343; H04L 27/2628
See application file for complete search history.

(56) References Cited

U.S. PATENT DOCUMENTS

| 2011/0305286 A1 | 12/2011 | Shimezawa et al. |
| 2016/0226637 A1* | 8/2016 | Nory ................. H04W 72/0453 |
| 2017/0339697 A1 | 11/2017 | Park et al. |

FOREIGN PATENT DOCUMENTS

| CN | 1476695 A | 2/2004 |
| CN | 101375571 A | 2/2009 |

(Continued)

OTHER PUBLICATIONS

3GPP TSG-RAN WG1 Meeting #88, R1-1701637, UE-group common control signaling, Huawei, HiSilicon, Athens, Greece, Feb. 13-17, 2017, total 3 pages.

(Continued)

*Primary Examiner* — Duc C Ho

(74) *Attorney, Agent, or Firm* — Gregg Jansen

(57) ABSTRACT

This application provides a symbol processing method and apparatus. The method includes obtaining, based on a plurality of complex-valued symbols, a first set corresponding to a first transmitted symbol and a second set corresponding to a second transmitted symbol, performing a copy operation on the first set and the second set so both the first set and the second set have first complex-valued symbols, and a first subset start location including the first complex-valued symbols in the first set is the same as a second subset start location including the first complex-valued symbols in the second set; and performing signal processing including a cyclic shift or frequency domain weighting on the first set and the second set. The start location and an end location of the first subset respectively correspond to locations preceding and following a first reference point of the first transmitted symbol.

20 Claims, 14 Drawing Sheets

(56) References Cited

FOREIGN PATENT DOCUMENTS

| | | |
|---|---|---|
| CN | 1881968 B | 7/2011 |
| CN | 105580302 A | 5/2016 |
| CN | 109417451 A | 3/2019 |
| WO | 2008056901 A1 | 5/2008 |
| WO | 2009151358 A1 | 12/2009 |
| WO | 2017031649 A1 | 3/2017 |
| WO | 2018059330 A1 | 4/2018 |

OTHER PUBLICATIONS

3GPP TSG-RAN WG1 #89, R1-1707804, Transmit diversity for DFTsOFDM-based PUCCH in long duration, Mitsubishi Electric, Hangzhou, China, May 15-19, 2017, total 11 pages.

* cited by examiner 1, 2, and 3 are three available occasions for a cyclic shift 4 represents an occasion on which a cyclic shift can be performed $L_{CP}$ represents an equivalent length of a CP length in a time domain vector before DFT

SYMBOL PROCESSING METHOD AND APPARATUS

CROSS-REFERENCE TO RELATED APPLICATIONS

This application is a continuation of International Application No. PCT/CN2020/095632, filed on Jun. 11, 2020, which claims priority to Chinese Patent Application No. 201910590953.0, filed on Jul. 2, 2019. The disclosures of the aforementioned applications are hereby incorporated by reference in their entireties.

TECHNICAL FIELD

This application relates to the communication field, and specifically, to a symbol processing method and apparatus.

BACKGROUND

To resist a multipath effect of a channel, a technology of adding a guard interval between symbols is proposed. First, the guard interval can remove intersymbol interference (ISI) between adjacent symbols. Second, after a transmitted symbol passes through a multipath channel, the guard interval converts a linear convolution of the channel and the transmitted symbol into a cyclic convolution of the channel and the transmitted symbol, so that a symbol receive end can eliminate the multipath effect of the channel by using a frequency domain equalization method.

In general, a cyclic prefix (CP) is used as a guard interval between symbols. The CP is a cyclic structure formed by copying a segment of data at the end (or referred to as a tail) of a data symbol to the start (or referred to as a header) of the symbol.

To perform flexible multiuser multiplexing, a stable frame structure needs to be maintained. To maintain a stable frame structure, a CP length is fixed. During implementation, a network device configures a same CP length for a plurality of users. However, channel conditions are different for different users, and therefore requirements for a CP length may also be different. To ensure performance of all users, a system selects a CP whose length is greater than a multipath delay of a user with large delay spreading. However, for a user with small delay spreading, an excessive CP causes unnecessary overheads.

Therefore, in the conventional technology, a guard interval between symbols cannot be flexibly configured based on a user requirement.

SUMMARY

This application provides a symbol processing method and apparatus, to flexibly configure a guard interval between symbols when a CP length is fixed.

According to a first aspect, a symbol processing method is provided. The method includes: sending a first transmitted symbol and a second transmitted symbol. The first transmitted symbol and the second transmitted symbol are consecutive in time domain, and the first transmitted symbol is located before the second transmitted symbol. A symbol component whose end location is a first reference point in the first transmitted symbol is the same as a symbol component whose end location is a second reference point in the second transmitted symbol, the first reference point represents an end location of a transmitted symbol, and the second reference point represents a location from which a CP is obtained through truncation in a transmitted symbol. A distance between the second reference point and an end location of the transmitted symbol is equal to a CP length. The second transmitted symbol has a CP.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of a common symbol component between the first transmitted symbol and the second transmitted symbol.

In addition, it should be understood that the length of the common symbol component between the first transmitted symbol and the second transmitted symbol does not affect a frame structure of the transmitted symbol. Therefore, for users with different channel conditions, such common symbol components with different lengths are configured, so that a guard interval between symbols can be flexibly configured first, and then (frequency division, spatial, and time division) multiplexing can also be performed between users for which different guard intervals are configured.

Therefore, in this application, when a CP length is fixed, a guard interval between symbols can be flexibly configured, and a length of the guard interval can also be flexibly configured based on a user requirement.

According to a second aspect, a symbol processing method is provided. The method includes: obtaining a plurality of complex-valued symbols; dividing the plurality of complex-valued symbols into a plurality of sets, where each set corresponds to one transmitted symbol; and performing a copy operation on the plurality of sets, so that two sets corresponding to two transmitted symbols that are consecutive in time domain have some same complex-valued symbols.

In this application, a copy operation is performed on two sets corresponding to two transmitted symbols that are consecutive in time domain, so that the two sets have same complex-valued symbols. This helps obtain the first transmitted symbol and the second transmitted symbol in the method provided in the first aspect. Therefore, in this application, a guard interval between symbols can be flexibly configured when a CP length is fixed.

According to a third aspect, a symbol processing method is provided. The method includes: obtaining a plurality of complex-valued symbols; dividing the plurality of complex-valued symbols into a plurality of sets, where each set corresponds to one transmitted symbol, the plurality of sets include a first set corresponding to a first transmitted symbol and a second set corresponding to a second transmitted symbol, the first transmitted symbol and the second transmitted symbol are consecutive in time domain, and the first transmitted symbol is located before the second transmitted symbol; performing a copy operation on the first set and the second set, so that both the first set and the second set have first complex-valued symbols, where a subset including the first complex-valued symbols in the first set is referred to as a first subset, a subset including the first complex-valued symbols in the second set is referred to as a second subset, and a time domain location of the first subset may be the same as or different from a time domain location of the second subset; and performing signal processing on the first set and the second set obtained through the copy operation, where the signal processing includes a cyclic shift or frequency domain weighting.

It should be understood that if the signal processing is a cyclic shift, signal processing is performed on a time domain signal corresponding to the first set and a time domain signal corresponding to the second set; or if the signal processing is frequency domain weighting, frequency domain weighting is performed on a frequency domain signal corresponding to the first set and a frequency domain signal corresponding to the second set.

There are a plurality of implementations of performing signal processing on the first set and the second set obtained through the copy operation.

Optionally, in a first implementation, the signal processing includes first signal processing, and the first signal processing includes a cyclic shift or frequency domain weighting.

In the first implementation, the performing signal processing on the first set and the second set obtained through the copy operation includes: separately performing first signal processing on the first set and the second set obtained through the copy operation, where through the first signal processing, an end location of the first subset corresponds to a first reference point of the first transmitted symbol, and an end location of the second subset corresponds to a second reference point of the second transmitted symbol. The first reference point represents an end location of a transmitted symbol, and the second reference point represents a location from which a CP is obtained through truncation in a transmitted symbol.

It should be understood that a copy operation is performed on the first set and the second set corresponding to the first transmitted symbol and the second transmitted symbol that are consecutive in time domain, so that both the first set and the second set have the first complex-valued symbols. First signal processing is performed on the first set and the second set, so that the end location of the first subset including the first complex-valued symbols in the first set corresponds to the first reference point of the first transmitted symbol, and the end location of the second subset in the second set corresponds to the second reference point of the second transmitted symbol. This obtains the first transmitted symbol and the second transmitted symbol in the method provided in the first aspect. Therefore, in this application, a guard interval between symbols can be flexibly configured when a CP length is fixed.

Optionally, in a second implementation, the signal processing includes first signal processing and second signal processing, the first signal processing includes a cyclic shift or frequency domain weighting, and the second signal processing includes a cyclic shift or frequency domain weighting. If the first signal processing is a cyclic shift, the second signal processing is a cyclic shift; or if the first signal processing is frequency domain weighting, the second signal processing may be frequency domain weighting or a cyclic shift.

In the second implementation, the performing signal processing on the first set and the second set obtained through the copy operation includes: separately performing first signal processing on the first set and the second set obtained through the copy operation, where through the first signal processing, an end location of the first subset corresponds to a first reference point of the first transmitted symbol, and an end location of the second subset corresponds to a second reference point of the second transmitted symbol; and simultaneously performing second signal processing on a signal obtained by performing first signal processing on the first set and a signal obtained by performing first signal processing on the second set, where through the second signal processing, a start location of the first subset corresponds to a location preceding the first reference point of the first transmitted symbol, the end location of the first subset corresponds to a location following the first reference point of the first transmitted symbol, a start location of the second subset corresponds to a location preceding the second reference point of the second transmitted symbol, and the end location of the second subset corresponds to a location following the second reference point of the second transmitted symbol. The first reference point represents an end location of a transmitted symbol, and the second reference point represents a location from which a CP is obtained through truncation in a transmitted symbol.

In the second implementation, the second signal processing may be understood as a common shift operation on the first set and the second set.

It should be understood that a copy operation is performed on the first set and the second set corresponding to the first transmitted symbol and the second transmitted symbol that are consecutive in time domain, so that both the first set and the second set have the first complex-valued symbols. First signal processing and second signal processing are performed on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol. This obtains the first transmitted symbol and the second transmitted symbol in the method provided in the first aspect. Therefore, in this application, a guard interval between symbols can be flexibly configured when a CP length is fixed.

In addition, it should be understood that impact on extension of a guard interval between symbols that is caused by an effect of filtering can be reduced to some extent by performing first signal processing and second signal processing on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol.

Optionally, in a third implementation, the signal processing includes third signal processing, and the third signal processing includes a cyclic shift or frequency domain weighting.

In the third implementation, the performing signal processing on the first set and the second set obtained through the copy operation includes: separately performing third signal processing on the first set and the second set obtained through the copy operation, where through the third signal processing, a start location of the first subset corresponds to a location preceding a first reference point of the first transmitted symbol, an end location of the first subset corresponds to a location following the first reference point of the first transmitted symbol, a start location of the second subset corresponds to a location preceding a second reference point of the second transmitted symbol, and an end location of the second subset corresponds to a location following the second reference point of the second transmitted symbol, where the first reference point represents an end location of a transmitted symbol, and the second reference point represents a location from which a CP is obtained through truncation in a transmitted symbol.

It should be understood that the third implementation may be considered as a result of combining the first signal processing and the second signal processing in the second implementation into one time of signal processing. Both the first signal processing and the second signal processing are cyclic shifts, or both the first signal processing and the second signal processing are frequency domain weighting.

It should be further understood that a copy operation is performed on the first set and the second set corresponding to the first transmitted symbol and the second transmitted symbol that are consecutive in time domain, so that both the first set and the second set have the first complex-valued symbols. Third signal processing is performed on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol. This obtains the first transmitted symbol and the second transmitted symbol in the method provided in the first aspect. Therefore, in this embodiment of this application, a guard interval between symbols can be flexibly configured when a CP length is fixed.

In addition, it should be understood that impact on extension of a guard interval between symbols that is caused by an effect of filtering can be reduced to some extent by performing third signal processing on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol.

It should be noted that, that "the start location of the first subset corresponds to the location preceding the first reference point of the first transmitted symbol, and the end location of the first subset corresponds to the location following the first reference point of the first transmitted symbol" mentioned in this specification means that the start location of the first subset in the first set corresponds to a tail location of the first transmitted symbol, and the end location of the first subset corresponds to a header location of the first transmitted symbol.

That "the start location of the first subset corresponds to the location preceding the first reference point of the first transmitted symbol, and the end location of the first subset corresponds to the location following the first reference point of the first transmitted symbol" mentioned in this specification exists on a premise that signal processing is performed on the first set, in other words, a cyclic shift or frequency domain weighting is performed on the first set. It should be understood that, on the premise of a cyclic shift (or frequency domain weighting), that "the end location of the first subset corresponds to the location following the first reference point of the first transmitted symbol" may mean that "the end location of the first subset corresponds to the header location of the first transmitted symbol", or "the end location of the first subset corresponds to a location following a third reference point of the first transmitted symbol, where the third reference point represents a start location of a transmitted symbol". Alternatively, in terms of a time domain structure of the first transmitted symbol, that "the end location of the first subset corresponds to the location following the first reference point of the first transmitted symbol" may be expressed as follows: "The end location of the first subset corresponds to the location preceding the first reference point of the first transmitted symbol".

It should be further noted that, in this specification, to illustrate that a time domain location that is in the first transmitted symbol and that corresponds to the time domain location of the first subset overlaps the first reference point (namely, an end location of the first transmitted symbol) of the first transmitted symbol, the following description manner is used: "The start location of the first subset corresponds to the location preceding the first reference point of the first transmitted symbol, and the end location of the first subset corresponds to the location following the first reference point of the first transmitted symbol".

With reference to the third aspect, in an implementation of the third aspect, the performing signal processing on the first set and the second set includes: performing frequency domain processing on the first set and the second set to obtain a frequency domain signal corresponding to the first set and a frequency domain signal corresponding to the second set; performing inverse fast Fourier transform (IFFT) on the frequency domain signal corresponding to the first set and the frequency domain signal corresponding to the second set, to obtain a time domain signal corresponding to the first set and a time domain signal corresponding to the second set; and performing a cyclic shift on the time domain signal corresponding to the first set and the time domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which the transmitted symbol is a discrete Fourier transform-spread-orthogonal frequency division multiplexing (DFT-s-OFDM) symbol.

In this application, impact on extension of a guard interval between symbols that is caused by an effect of filtering can be reduced to some extent by performing a cyclic shift after the IFFT, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

With reference to the third aspect, in an implementation of the third aspect, the performing signal processing on the first set and the second set includes: performing discrete Fourier transform (DFT) on the first set and the second set to obtain a frequency domain signal corresponding to the first set and a frequency domain signal corresponding to the second set; and performing frequency domain weighting on the frequency domain signal corresponding to the first set and the frequency domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which the transmitted symbol is a DFT-s-OFDM symbol.

In this application, impact on extension of a guard interval between symbols that is caused by an effect of filtering can be reduced to some extent by performing frequency domain weighting after the DFT, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

With reference to the third aspect, in an implementation of the third aspect, the performing signal processing on the first set and the second set includes: directly performing a cyclic shift on the first set and the second set obtained through the copy operation, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which the transmitted symbol is a DFT-s-OFDM symbol or a single carrier-quadrature amplitude modulation (SC-QAM) symbol.

With reference to the third aspect, in an implementation of the third aspect, the performing a copy operation on the first set and the second set includes: performing a copy operation on the first set and the second set, so that the time domain location of the first subset may be the same as the time domain location of the second subset, in other words, a time domain index of the start location of the first subset is the same as a time domain index of the start location of the second subset, and a time domain index of the end location of the first subset is the same as a time domain index of the end location of the second subset.

The copy operation in this implementation is referred to as a co-location copy operation.

With reference to the third aspect, in an implementation of the third aspect, in the process of performing a copy operation on the first set and the second set, the time domain index of the start location of the first subset is related to a CP length and a symbol number.

Optionally, in the process of performing a copy operation on the first set and the second set, the time domain index i of the start location of the first subset meets the following formula:

$i = A + CL_{CP}(l)$, where l represents a symbol number of the first set, A represents a time domain index of a subset participating in a copy operation in a set whose symbol number l is 0, and $CL_{CP}(l)$ represents an equivalent cumulative CP length of the first set whose symbol number is l.

It should be understood that in this application, a copy operation may be performed on sets corresponding to a plurality of consecutive transmitted symbols.

With reference to the third aspect, in an implementation of the third aspect, the first subset and the second subset have a same length, but do not have a same index. For example, the time domain location of the first subset is different from the time domain location of the second subset. In this case, in a subsequent processing step, a transmitter may adjust the first subset and the second subset to a same time domain location by performing processing such as a time domain cyclic shift or frequency domain weighting. This is equivalent to co-location copying.

With reference to the third aspect, in an implementation of the third aspect, the performing a copy operation on the first set and the second set includes: copying the first complex-valued symbols in the first set into the second set.

The copying manner in this implementation may be referred to as backward copying.

Optionally, in this implementation, the first transmitted symbol is a reference signal, and the second transmitted symbol is a non-reference signal.

With reference to the third aspect, in an implementation of the third aspect, the performing a copy operation on the first set and the second set includes: copying the first complex-valued symbols in the second set into the first set.

The copying manner in this implementation may be referred to as forward copying.

Optionally, in this implementation, the first transmitted symbol is a non-reference signal, and the second transmitted symbol is a reference signal.

With reference to the third aspect, in an implementation of the third aspect, the method further includes: generating the first transmitted symbol and the second transmitted symbol based on signals obtained through the signal processing, where the first subset corresponds to a first symbol component of the first transmitted symbol, the second subset corresponds to a second symbol component of the second transmitted symbol, and the first symbol component is the same as the second symbol component.

In an implementation, a symbol component whose end location is the first reference point in the first transmitted symbol is the same as a symbol component whose end location is the second reference point in the second transmitted symbol.

Therefore, in this application, when a CP length is fixed, a guard interval between symbols can be flexibly configured, and a length of the guard interval can also be flexibly configured based on a user requirement.

According to a fourth aspect, a symbol processing method is provided. The method includes: obtaining a plurality of complex-valued symbols; dividing the plurality of complex-valued symbols into a plurality of sets, where the plurality of sets include a first set and a second set, the first set corresponds to a first transmitted symbol, the second set corresponds to a second transmitted symbol, the first transmitted symbol and the second transmitted symbol are consecutive in time domain, the first transmitted symbol is located before the second transmitted symbol, and complex-valued symbols in a first subset in the first set are the same as complex-valued symbols in a second subset in the second set; and performing signal processing on the first set and the second set, where the signal processing includes a cyclic shift or frequency domain weighting, and through the signal processing, a start location of the first subset corresponds to a location preceding a first reference point of the first transmitted symbol, an end location of the first subset corresponds to a location following the first reference point of the first transmitted symbol, a start location of the second subset corresponds to a location preceding a second reference point of the second transmitted symbol, and an end location of the second subset corresponds to a location following the second reference point of the second transmitted symbol, where the first reference point represents an end location of a transmitted symbol, and the second reference point represents a location from which a CP is obtained through truncation in a transmitted symbol.

The second set may include a plurality of complex-valued symbols.

Optionally, both the first transmitted symbol and the second transmitted symbol are reference signals such as demodulation reference signals (DMRSs).

It should be understood that, in this application, no copy operation is performed on the first set and the second set, and when the transmitted symbols corresponding to the first set and the second set are reference signals, a guard interval between the reference signals can be flexibly configured while accuracy of the reference signals is ensured.

With reference to the fourth aspect, in an implementation of the fourth aspect, the performing signal processing on the first set and the second set includes: performing frequency domain processing on the first set and the second set to obtain a frequency domain signal corresponding to the first set and a frequency domain signal corresponding to the second set; performing IFFT on the frequency domain signal corresponding to the first set and the frequency domain signal corresponding to the second set, to obtain a time domain signal corresponding to the first set and a time domain signal corresponding to the second set; and performing a cyclic shift on the time domain signal corresponding to the first set and the time domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which a waveform of the transmitted symbol is a DFT-s-OFDM waveform.

In this application, impact on extension of a guard interval between symbols that is caused by an effect of filtering can be reduced to some extent by performing a cyclic shift after the IFFT, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

With reference to the fourth aspect, in an implementation of the fourth aspect, the performing signal processing on the first set and the second set includes: performing DFT on the first set and the second set to obtain a frequency domain signal corresponding to the first set and a frequency domain signal corresponding to the second set; and performing frequency domain weighting on the frequency domain signal corresponding to the first set and the frequency domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which the transmitted symbol is a DFT-s-OFDM symbol.

In this application, impact on extension of a guard interval between symbols that is caused by an effect of filtering can be reduced to some extent by performing frequency domain weighting after the DFT, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

With reference to the fourth aspect, in an implementation of the fourth aspect, the performing signal processing on the first set and the second set includes: directly performing a cyclic shift on the first set and the second set obtained through the copy operation, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This implementation is applicable to a scenario in which the transmitted symbol is a DFT-s-OFDM symbol or an SC-QAM symbol.

According to a fifth aspect, a symbol processing apparatus is provided. The apparatus is configured to perform the method provided in any one of the first aspect to the fourth aspect.

Optionally, the apparatus may include a module configured to perform the method provided in any one of the first aspect to the fourth aspect.

According to a sixth aspect, a symbol processing apparatus is provided. The apparatus includes a memory and a processor. The memory is configured to store instructions, the processor is configured to execute the instructions stored in the memory, and execution of the instructions stored in the memory enables the processor to perform the method provided in any one of the first aspect to the fourth aspect.

According to a seventh aspect, a chip is provided. The chip includes a processing module and a communication interface, the processing module is configured to control the communication interface to communicate with the outside, and the processing module is further configured to implement the method provided in any one of the first aspect to the fourth aspect.

According to an eighth aspect, a computer-readable storage medium is provided. The computer-readable storage medium stores a computer program, and when the computer program is executed by a computer, the computer is enabled to implement the method provided in any one of the first aspect to the fourth aspect.

According to a ninth aspect, a computer program product including instructions is provided. When the instructions are executed by a computer, the computer is enabled to implement the method provided in any one of the first aspect to the fourth aspect.

Therefore, in this application, when the CP length is fixed, the guard interval between symbols can be flexibly configured, and the length of the guard interval can also be flexibly configured based on the user requirement.

DESCRIPTION OF EMBODIMENTS

The following describes technical solutions of this application with reference to accompanying drawings.

Unless otherwise defined, all technical and scientific terms used in this specification have same meanings as those usually understood by a person skilled in the art of this application. The terms used in the specification of this application are merely for the purpose of describing embodiments, and are not intended to limit this application.

Compared with a multi-carrier waveform such as orthogonal frequency division multiplexing (OFDM), a single-carrier waveform such as DFT-s-OFDM or SC-QAM has a lower peak to average power ratio (PAPR). Therefore, in a case of a same power amplifier, the single-carrier waveform can provide larger output power and higher power amplification efficiency, and this improves coverage and reducing energy consumption. Therefore, single-carrier waveforms such as DFT-s-OFDM or SC-QAM are widely applied to various communication systems such as a long term evolution (LTE) system, a 5th generation (5G) system, or a new radio (NR) system.

DFT-s-OFDM is discrete Fourier transform-spread-orthogonal frequency division multiplexing (DFT-s-OFDM). SC-QAM is single carrier-quadrature amplitude modulation (SC-QAM).

In both NR and LTE, the DFT-s-OFDM waveform uses a CP as a guard interval between symbols (DFT-s-OFDM symbols).

Figure 1:
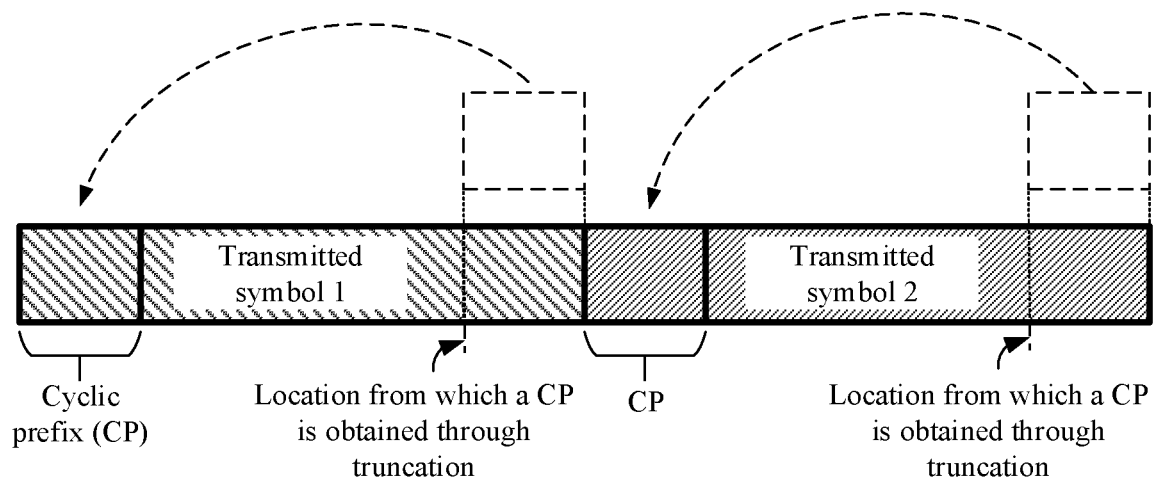
FIG. 1 and FIG. 2 are diagrams of using a CP as a guard interval between symbols.

FIG. 1 is a diagram of a time domain structure in which a CP is used as a guard interval between symbols. In FIG. 1, two transmitted symbols are provided: a transmitted symbol 1 and a transmitted symbol 2. A CP of the transmitted symbol 1 refers to a cyclic structure formed by copying a segment of transmitted symbol components between a location from which a CP is obtained through truncation and an end location in the transmitted symbol 1 to the start of the transmitted symbol 1. Similarly, a CP of the transmitted symbol 2 refers to a cyclic structure formed by copying a segment of transmitted symbol components between a location from which a CP is obtained through truncation and an end location in the transmitted symbol 2 to the start of the transmitted symbol 2.

The CP of the transmitted symbol 2 is used as a guard interval between the transmitted symbol 1 and the transmitted symbol 2, and the CP of the transmitted symbol 1 is used as a guard interval between the transmitted symbol 1 and a transmitted symbol (not shown in FIG. 1) preceding the transmitted symbol 1.

Figure 2:
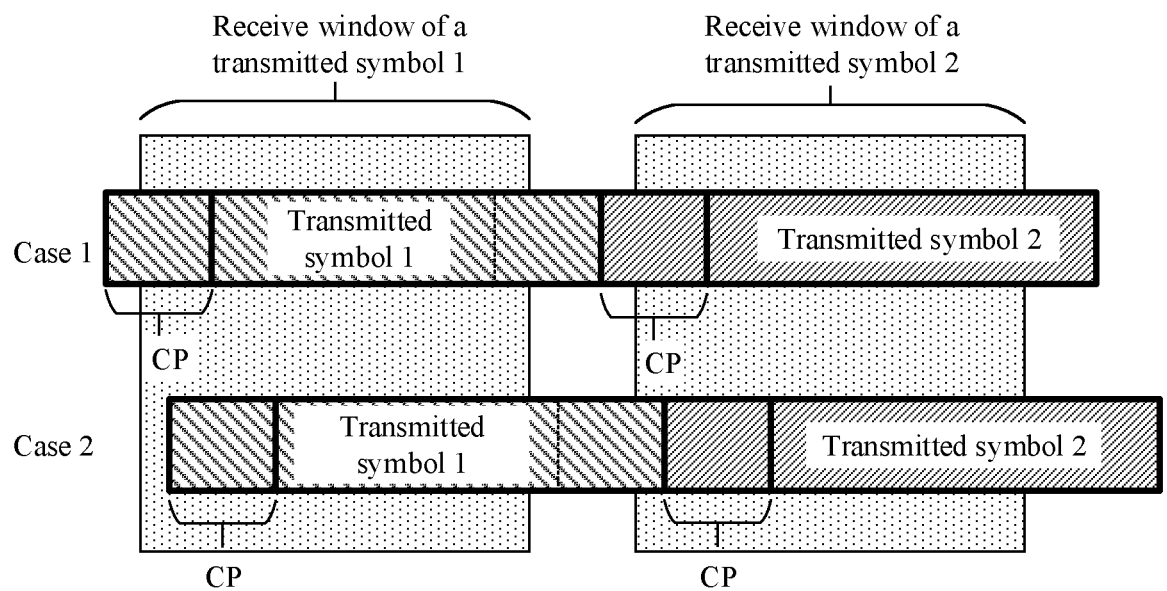

FIG. 2 shows receiving cases, at a receive end, of the transmitted symbol 1 and the transmitted symbol 2 shown in FIG. 1 after the transmitted symbol 1 and the transmitted symbol 2 are transmitted through a channel (FIG. 2 shows only a maximum multipath delay of the channel as an example).

Case 1 indicates that the maximum multipath delay of the channel does not exceed a CP length. In Case 1, because of protection of a CP, a receive window of none of transmitted symbols includes ISI of another transmitted symbol. As shown in FIG. 2, a receive window of the transmitted symbol 2 does not include the transmitted symbol 1, and therefore ISI of the transmitted symbol 1 can be avoided, and a receive window of the transmitted symbol 1 does not include the transmitted symbol (not shown in FIG. 2) preceding the transmitted symbol 1, and therefore the transmitted symbol 1 is not subject to ISI, either. In addition, in Case 1, in the receive window of each transmitted symbol, a received symbol is a cyclic convolution of the transmitted symbol and the channel, so that the receive end can eliminate a multipath effect of the channel by using a frequency domain equalization method.

Case 2 indicates that the maximum multipath delay of the channel exceeds a CP length. In Case 2, because the channel delay exceeds the CP length, a receive window of one transmitted symbol includes another transmitted symbol. As shown in FIG. 2, a receive window of the transmitted symbol 2 includes a segment of transmitted symbol components of the transmitted symbol 1, and therefore the transmitted symbol 2 is subject to ISI of the transmitted symbol 1, and a receive window of the transmitted symbol 1 may also include the transmitted symbol (not shown in FIG. 2) preceding the transmitted symbol 1, and therefore the transmitted symbol 1 is also subject to ISI. In addition, in Case 2, in a receive window of each transmitted symbol, a received symbol is no longer a cyclic convolution of the transmitted symbol and the channel. This is not helpful for the receive end to eliminate a multipath effect of the channel.

The transmitted symbol mentioned above represents a symbol sent by a transmit end, and the received symbol represents a symbol received by the receive end.

It can be learned from FIG. 2 that a CP length required by a channel condition in Case 2 is greater than a CP length required by a channel condition in Case 1. In other words, different channel conditions may also require different CP lengths.

It can be learned from FIG. 1 or FIG. 2 that a CP length affects a frame structure. Because of reasons such as complexity of a transceiver and out-of-band interference, flexibility of performing (frequency division, spatial, and time division) multiplexing between users with different CP lengths is relatively poor. In an implementation, to perform flexible multiuser multiplexing, a network device usually configures a same CP length for different users. However, as shown in FIG. 2, user equipment with different channel conditions may also require different CP lengths. In the conventional technology, to overcome the problem shown in FIG. 2, in other words, to ensure performance of all users with different channel conditions, a system selects, as CP lengths of all users, CP lengths greater than a channel delay of a large-delay user. However, for a small-delay user, an excessive CP length causes unnecessary signaling overheads.

It can be learned from the foregoing descriptions that, in the conventional technology, a guard interval between symbols cannot be flexibly configured based on a user requirement.

This application provides a symbol processing method and apparatus, so that a guard interval between symbols can be flexibly configured when a CP length is fixed.

The technical solutions in the embodiments of this application may be applied to various communication systems, for example, a cellular communication system such as LTE and evolution of the cellular communication system, a 5G system, an NR system, a machine-to-machine (M2M) system, and another future evolved communication system.

An embodiment of this application provides a symbol processing method. The method includes: sending a first transmitted symbol and a second transmitted symbol that are consecutive in time domain, where the first transmitted symbol is located before the second transmitted symbol, and a symbol component whose end location is a first reference point in the first transmitted symbol is the same as a symbol component whose end location is a second reference point in the second transmitted symbol.

The first reference point represents an end location of a transmitted symbol, and the second reference point represents a location from which a CP is obtained through truncation in a transmitted symbol, in other words, a distance between the second reference point and an end location of the transmitted symbol is equal to a CP length.

The second transmitted symbol has a CP.

Figure 3:
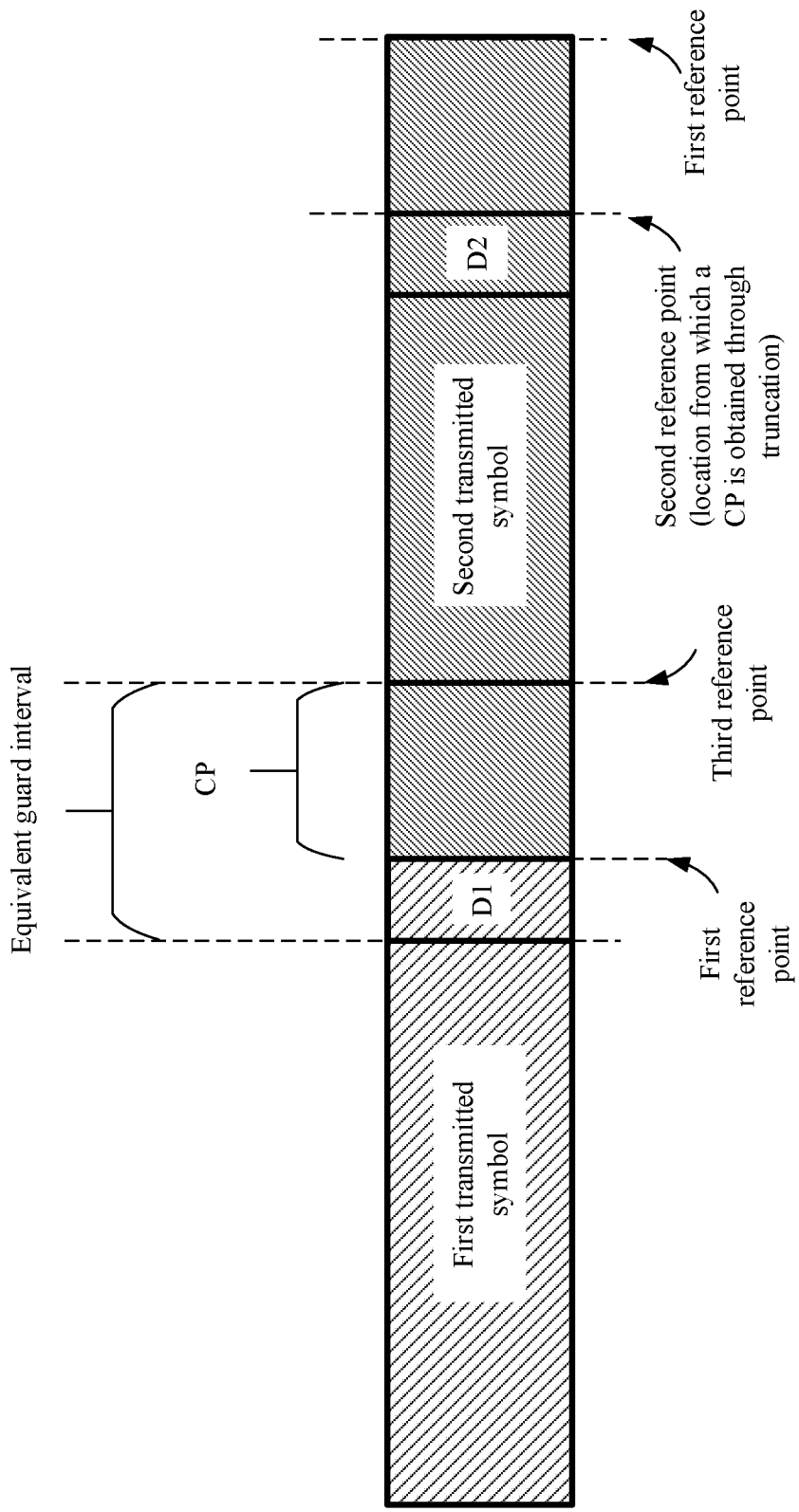
FIG. 3 is a diagram of a time domain structure of a transmitted symbol according to an embodiment of this application.

For example, FIG. 3 is a diagram of time domain structures of a first transmitted symbol and a second transmitted symbol. A symbol component D1 in the first transmitted symbol is the same as a symbol component D2 in the second transmitted symbol, an end location of the symbol component D1 in the first transmitted symbol is a first reference point, and an end location of the symbol component D2 in the second transmitted symbol is a second reference point. The first reference point represents an end location of a transmitted symbol, and the second reference point represents a location from which a CP is obtained through truncation in a transmitted symbol.

That a symbol component D1 in the first transmitted symbol is the same as a symbol component D2 in the second transmitted symbol includes: Content included in the symbol component D1 and the symbol component D2 is the same, and time lengths of the symbol component D1 and the symbol component D2 are the same. That content included in the symbol component D1 and the symbol component D2 is the same may be understood as follows: Complex-valued symbols separately corresponding to the symbol component D1 and the symbol component D2 are the same before the symbol components are generated.

It should be noted that, in the foregoing descriptions with reference to FIG. 3, "a symbol component D1 in the first transmitted symbol is the same as a symbol component D2 in the second transmitted symbol" is mentioned. Herein, "the same" is not necessarily "absolutely the same", and may alternatively indicate "approximately the same". It should be understood that there may be a slight deviation between the symbol component D1 in the first transmitted symbol and the symbol component D2 in the second transmitted symbol because of an effect of filtering.

The symbol processing method provided in this application may be implemented by a transmit end, for example, may be implemented by a transmitter or a circuit used to implement a transmitter. The transmit end may be a terminal device, or may be a network device.

The transmitted symbol in this embodiment of this application may be an uplink waveform symbol and/or a downlink waveform symbol in a communication system.

Figure 4:
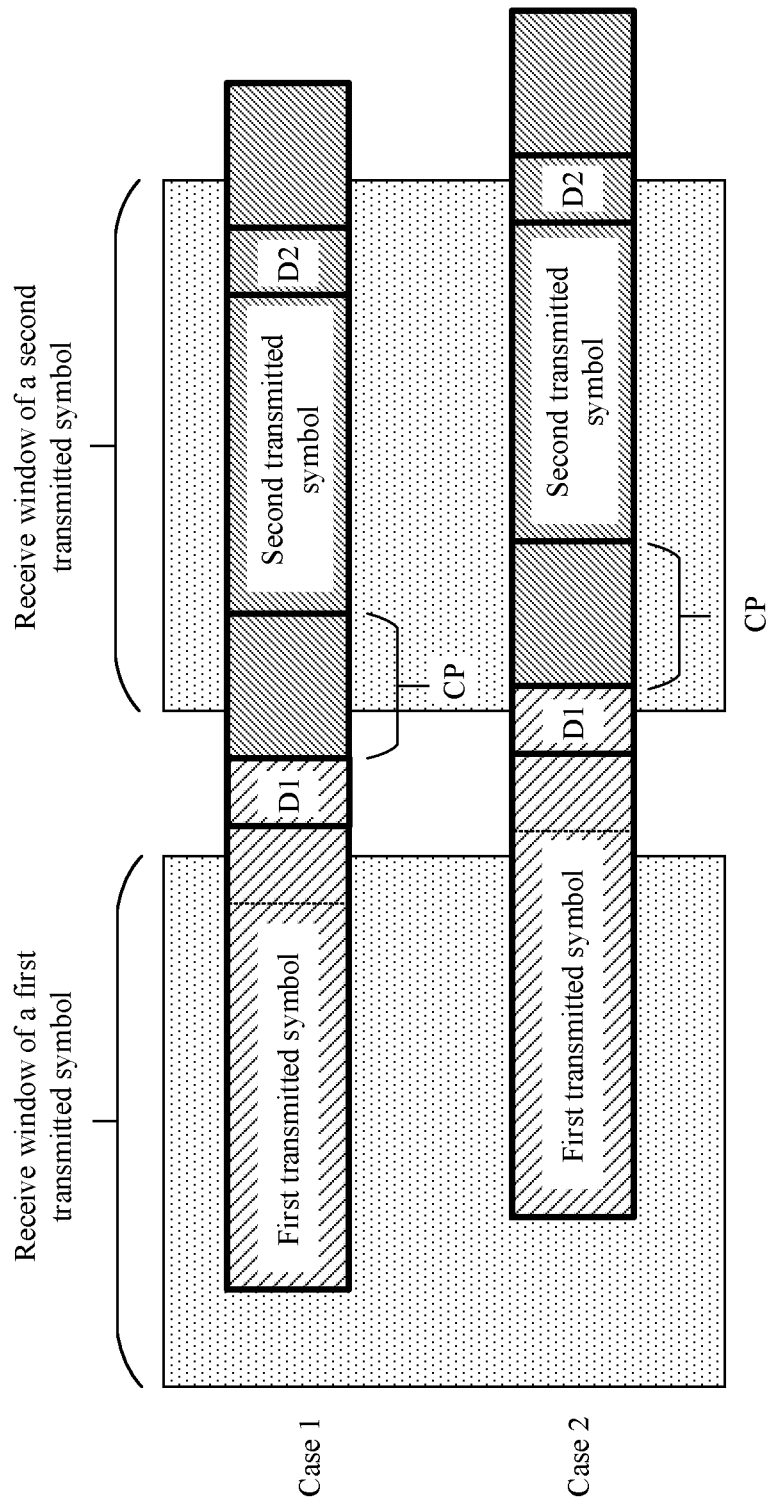
FIG. 4 is another diagram of a time domain structure of a transmitted symbol according to an embodiment of this application.

FIG. 4 shows receiving cases, at a receive end (corresponding to the transmit end), of the first transmitted symbol and the second transmitted symbol shown in FIG. 3 (after the first transmitted symbol and the second transmitted symbol are transmitted through a channel).

Case 1 indicates that a maximum multipath delay of the channel does not exceed a CP length. In Case 1, because of protection of a CP, a receive window of none of transmitted symbols includes ISI of another transmitted symbol. As shown in FIG. 4, a receive window of the second transmitted symbol does not include a component of the first transmitted symbol, so that ISI of the first transmitted symbol can be avoided.

Case 2 indicates that a maximum multipath delay of the channel exceeds a CP length. In Case 2, because the channel delay exceeds the CP length, a receive window of one transmitted symbol may include another transmitted symbol. As shown in FIG. 4, the symbol component D1 in the first transmitted symbol enters the receive window of the second transmitted symbol. However, because the symbol component D1 in the first transmitted symbol is the same as the symbol component D2 in the second transmitted symbol, that the symbol component D1 in the first transmitted symbol enters the receive window of the second transmitted symbol equivalently means that the symbol component D2 in the second transmitted symbol enters the receive window of the second transmitted symbol. In addition, because the symbol component D2 and a symbol component used as a CP are consecutive in the second transmitted symbol, based on a principle that a CP of the second transmitted symbol does not cause ISI to the second transmitted symbol, the symbol component D1 that is in the first transmitted symbol and that enters the receive window of the second transmitted symbol does not cause ISI to the second transmitted symbol, either.

It can be learned from FIG. 3 and FIG. 4 that even if a CP length is fixed, a length of the symbol component D1 may be flexibly configured (which equivalently means that a length of the symbol component D2 is flexibly configured), so that a sum of the length of the symbol component D1 and the CP length is greater than a channel delay, and therefore a multipath effect of the channel can be resisted.

For better understanding instead of limitation, in the examples of FIG. 3 and FIG. 4, the symbol component D1 in the first transmitted symbol and the CP of the second transmitted symbol may be considered together as an equivalent guard interval between the first transmitted symbol and the second transmitted symbol, as shown in FIG. 3.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of a common symbol component between the first transmitted symbol and the second transmitted symbol.

In addition, it should be understood that the length of the common symbol component between the first transmitted symbol and the second transmitted symbol does not affect a frame structure of the transmitted symbol. Therefore, for users with different channel conditions, such common symbol components with different lengths are configured, so that a guard interval between symbols can be flexibly configured first, and then (frequency division, spatial, and time division) multiplexing can also be performed between users for which different guard intervals are configured.

Therefore, in this application, when a CP length is fixed, a guard interval between symbols can be flexibly configured, and a length of the guard interval can also be flexibly configured based on a user requirement.

It should be noted that all lengths, for example, a CP length and a length of a symbol component, mentioned in this specification are time lengths. For example, the length (namely, the time length) mentioned in this specification is in a unit of $T_c=1/(4096 \cdot 480 \cdot 10^3)$ seconds. For another example, the time length may be alternatively represented by a quantity of time domain sampling points.

It should be further noted that, for ease of understanding and description instead of limitation, in this specification, three reference points are defined for the transmitted symbol: the first reference point, the second reference point, and a third reference point (to be mentioned in the following embodiments), as shown in FIG. 3. The first reference point represents an end location of a transmitted symbol, the second reference point represents a location from which a CP is obtained through truncation in a transmitted symbol, and the third reference point represents a start location of a transmitted symbol. A distance between the second reference point and an end location of the transmitted symbol is equal to a CP length. The start location of the transmitted symbol is the start location of the transmitted symbol, and is not a start location of a CP of the transmitted symbol. Alternatively, it may be understood from another perspective that the start location of the transmitted symbol is an end location of a CP of the transmitted symbol.

It should be further noted that all locations mentioned in this specification are time domain locations.

With reference to FIG. 3 and FIG. 4, the foregoing describes time domain structures of transmitted symbols (for example, the first transmitted symbol and the second transmitted symbol described above) in the embodiments of this application. The following describes content related to a process of generating a transmitted symbol.

Figure 5:
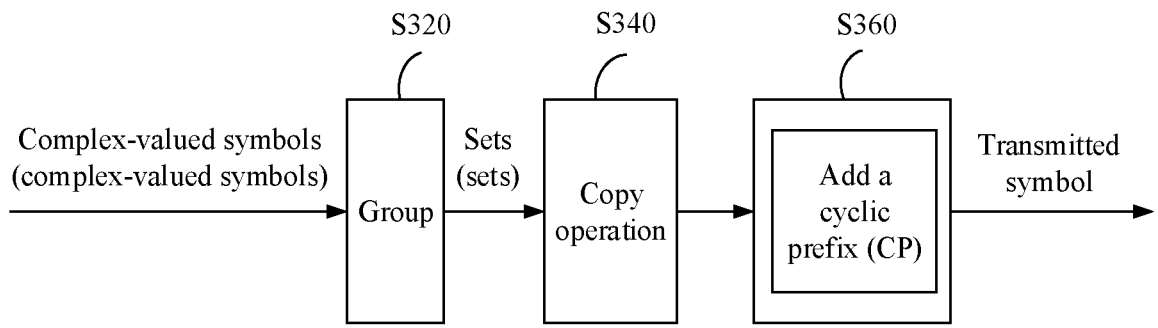
FIG. 5, FIG. 6, and FIG. 7 are flowcharts of a symbol processing method according to an embodiment of this application.

FIG. 5 is a diagram of a basic procedure of symbol processing according to another embodiment of this application. As shown in FIG. 5, the procedure includes the following steps S320, S340, and S360.

S320: Group a plurality of complex-valued symbols (complex-valued symbols) to obtain a plurality of sets (sets), where each set corresponds to one transmitted symbol.

Alternatively, a plurality of complex-valued symbols are divided into (be divided into) a plurality of sets, and each set corresponds to one transmitted symbol.

The plurality of complex-valued symbols may include a modulated symbol obtained by modulating an encoded bit stream.

A modulation scheme for modulating the encoded bit stream may include pi/2-binary phase shift keying (BPSK), quadrature phase shift keying (QPSK), 16 quadrature amplitude modulation (QAM), 64QAM, 256QAM, phase shift keying (PSK), amplitude phase shift keying (APSK), non-uniform QAM, or the like.

Optionally, the plurality of complex-valued symbols may further include a reference signal sampling point. For example, the reference signal sampling point may include a phase tracking reference signal (PTRS) sampling point.

That each set corresponds to one transmitted symbol means that each finally generated transmitted symbol is generated based on a corresponding set. For example, each set corresponds to one DFT-s-OFDM symbol or SC-QAM symbol.

Each set may include several complex-valued symbols. For example, each set may be considered as one multidimensional time domain vector, and complex-valued symbols in the set may be considered as elements in the time domain vector.

S340: Perform a copy operation on the plurality of sets obtained in step S320, so that two sets corresponding to two transmitted symbols that are consecutive in time domain have some same complex-valued symbols.

In this application, a copy operation may be performed on the sets in a plurality of manners. This is described below.

S360: Process the plurality of sets obtained in step S340 to obtain a plurality of transmitted symbols, where the processing includes adding a CP.

Alternatively, in step S360, a CP is added based on the sets obtained through the copy operation in step S340, and then another operation is performed to obtain transmitted symbols. The another operation described herein includes but is not limited to fast Fourier transform, carrier mapping, sampling, filtering, or the like.

It should be understood that, because two sets corresponding to two transmitted symbols that are consecutive in time domain have some same complex-valued symbols, time domain structures, shown in FIG. 3, of the two transmitted symbols corresponding to the two sets can be implemented to some extent.

Therefore, in this embodiment of this application, a copy operation is performed on two sets corresponding to two transmitted symbols that are consecutive in time domain, so that the two sets have same complex-valued symbols. This helps generate transmitted symbols whose time domain structures are shown in FIG. 3. In this way, a guard interval between symbols can be flexibly configured when a CP length is fixed.

For ease of distinguishing instead of limitation, the following agreement on names of signals is made in this specification: Signals to be grouped (or divided) into sets are referred to as complex-valued symbols. A signal obtained by grouping (or dividing) complex-valued symbols is referred to as a set. A set including some complex-valued symbols in the set is referred to as a subset. A signal sent by a transmit end is referred to as a transmitted symbol.

It should be understood that the names are only for ease of understanding and distinguishing instead of limitation. For example, in a future technology evolution process, signals obtained at different stages of a symbol generation procedure may have other names.

The transmitted symbol in this embodiment of this application may be a symbol of a single-carrier waveform. For example, the transmitted symbol is a DFT-s-OFDM symbol. The DFT-s-OFDM symbol represents a single-carrier symbol whose waveform is a DFT-s-OFDM waveform. For another example, the transmitted symbol is an SC-QAM symbol. The SC-QAM symbol represents a single-carrier symbol whose waveform is an SC-QAM waveform.

In the following descriptions, a wireless communication system to which the DFT-s-OFDM waveform is applicable in this application is denoted as an application scenario 1, and a wireless communication system to which the SC-QAM waveform is applicable in this application is denoted as an application scenario 2.

Figure 6:
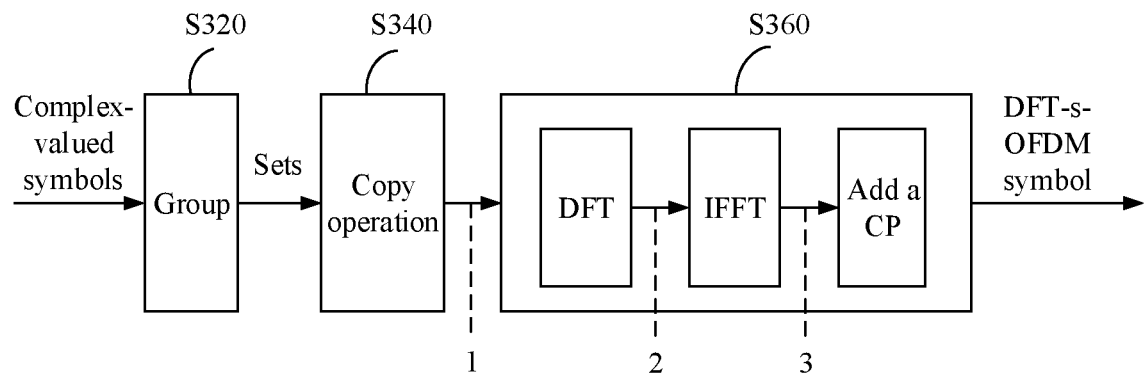

Optionally, an application scenario of this application is the application scenario 1, in other words, the transmitted symbol is a DFT-s-OFDM symbol. As shown in FIG. 6, in step S360, not only the operation of adding a CP is included, but also operations of DFT and IFFT are included.

For example, in step S360, a transmitter performs M-point DFT on the sets obtained through the copy operation, maps M-point frequency domain elements obtained through the DFT to M consecutive subcarriers (not shown in FIG. 6), performs IFFT on a frequency domain signal after the subcarrier mapping, and adds a CP to a signal obtained through the IFFT to finally obtain a DFT-s-OFDM symbol. The DFT may also be referred to as frequency domain precoding.

Optionally, step S360 further includes a frequency domain spectrum shaping (FDSS) operation.

For example, in step S360, a transmitter performs M-point DFT on the sets obtained through the copy operation, performs cyclic extension and frequency domain filtering (namely, the FDSS operation) on M-point frequency domain elements obtained through the DFT, then maps the frequency domain elements obtained through the FDSS operation to M1 (M1≥M) consecutive subcarriers, performs IFFT on a frequency domain signal after the subcarrier mapping, and adds a CP to a signal obtained through the IFFT to finally obtain a DFT-s-OFDM symbol.

It should be understood that, in the application scenario 1, the copy operation on the sets is performed before the DFT.

Figure 7:
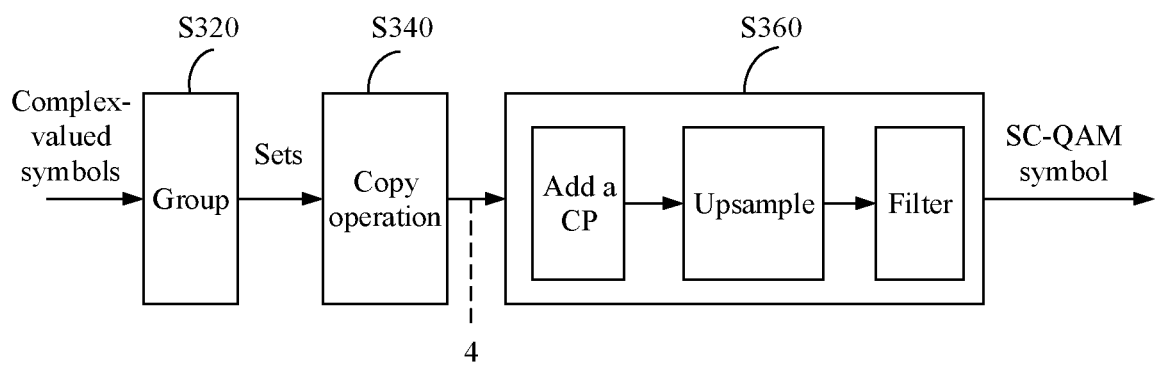

Optionally, an application scenario of this application is the application scenario 2, in other words, the transmitted symbol is an SC-QAM symbol. As shown in FIG. 7, in step S360, not only the operation of adding a CP is included, but also upsampling and filtering are included.

For example, in step S360, a transmitter adds a CP to the sets obtained through the copy operation, to obtain a signal obtained after the CP is added, and then performs upsampling and filtering on the signal obtained after the CP is added, to finally obtain an SC-QAM symbol.

It should be understood that, in the application scenario 2, the copy operation on the sets is performed before the CP is added.

Therefore, in this embodiment of this application, a copy operation is performed on two sets corresponding to two transmitted symbols that are consecutive in time domain, so that the two sets have same complex-valued symbols. This helps generate transmitted symbols whose time domain structures are shown in FIG. 3. In this way, a guard interval between symbols can be flexibly configured when a CP length is fixed.

For ease of understanding and description of the copy operation on the sets, the following first describes an association relationship between a set and a transmitted symbol.

For ease of description instead of limitation, three reference points are defined for the transmitted symbol: a first reference point, a second reference point, and a third reference point, as shown in FIG. 3. The first reference point represents an end location of a transmitted symbol, the second reference point represents a location from which a CP is obtained through truncation in a transmitted symbol, and the third reference point represents a start location of a transmitted symbol. A distance between the second reference point and an end location of the transmitted symbol is equal to a CP length.

The following separately uses the application scenario 1 and the application scenario 2 as examples for description.

(1) Application scenario 1: The transmitted symbol is a DFT-s-OFDM symbol. In the application scenario 1, a symbol processing procedure is shown in FIG. 6.

Assuming (denoted as an assumption 1) that the transmit end performs DFT on M points, a dimension of a time domain vector on which DFT needs to be performed should be M. The time domain vector may be denoted as follows:

$$x_l = [x_l(0), x_l(1), \ldots, x_l(M-1)]^T, \text{ where}$$

$x_l$ represents the time domain vector.

The time domain vector $x_l$ includes M elements, and time domain indexes of the first element to the last element are 0, 1, . . . , and M−1.

Assuming (denoted as an assumption 2) that the transmit end performs DFT on M points (consistent with the assumption 1), a size of IFFT performed by the transmit end is N, and a quantity of sampling points of a CP is Q, a quantity of points that may be equivalent to a length occupied by the CP before DFT is K=(Q/N)·M.

If Q is not dividable by N, a calculation result of K is a non-integer. In this case, rounding needs to be performed on the calculation result of K, that is, K=⌊(Q/N)·M⌋, where ⌊(Q/N)·M⌋ represents rounding down (Q/N)·M. It should be understood that the rounding manner herein may be alternatively rounding up, rounding off, or the like.

It should be understood that the quantity Q of sampling points of the CP may be obtained based on a CP length.

Based on the foregoing assumptions, a time domain index of a first reference point of the DFT-s-OFDM symbol in the time domain vector $x_l$ is M−1, a time domain index of a second reference point of the DFT-s-OFDM symbol in the time domain vector $x_l$ is M−K−1, and a time domain index of a third reference point of the DFT-s-OFDM symbol in the time domain vector $x_l$ is 0.

It should be understood that the foregoing correspondence may indicate a location of a main component of each complex-valued symbol in the DFT-s-OFDM symbol after the DFT-s-OFDM symbol is generated based on a set of complex-valued symbols.

(2) Application scenario 2: The transmitted symbol is an SC-QAM symbol. As shown in FIG. 7, in a process of generating the SC-QAM symbol, neither DFT nor IFFT is included before a CP is added, and upsampling and filtering are performed after the CP is added. Therefore, a quantity that is of points in a time domain vector and that is equivalent to a CP length may be directly obtained based on the CP length. Therefore, the transmitter may directly obtain an equivalent CP length value K1. The equivalent CP length value K1 may be obtained based on the CP length.

Assuming that a time domain vector before a CP is added is the M-dimensional time domain vector $x_l$ described in the application scenario 1, and an equivalent CP length value is K1, a time domain index of a first reference point of the SC-QAM symbol in the time domain vector $x_l$ is M−1, a time domain index of a second reference point of the SC-QAM symbol in the time domain vector $x_l$ is M−K1−1, and a time domain index of a third reference point of the SC-QAM symbol in the time domain vector $x_l$ is 0.

As described above, a set may be considered as a multi-dimensional time domain vector. The time domain vector $x_l$ in the foregoing example may represent a time domain vector corresponding to a set. An element in the time domain vector $x_l$ corresponds to a complex-valued symbol in the set. A time domain index of the element in the time domain vector $x_l$ corresponds to a location, in the set, of the complex-valued symbol in the set.

The foregoing example indicates that there is a correspondence between a time domain index of an element in the time domain vector $x_l$ and a time domain location (for example, the first reference point, the second reference point, or the third reference point) in a transmitted symbol corresponding to the time domain vector $x_l$. Therefore, it may be understood that there is also a correspondence between a location of a complex-valued symbol in a set and a location in a transmitted symbol corresponding to the set.

Figure 8:
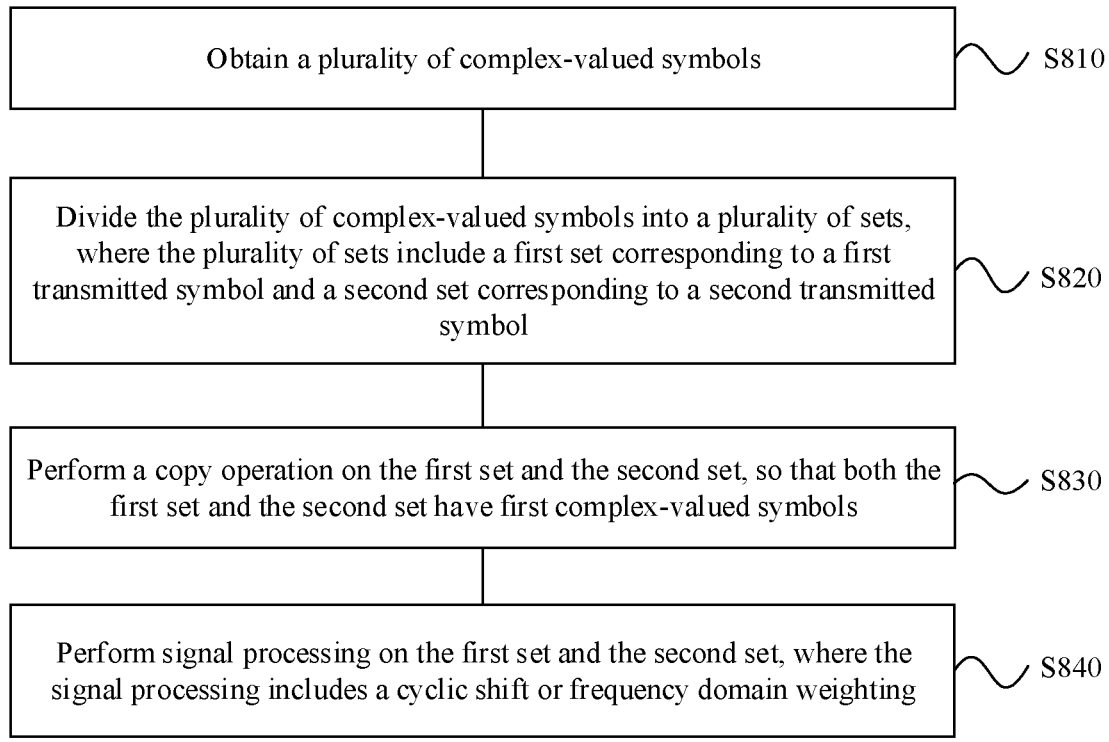
FIG. 8 is a flowchart of a symbol processing method according to an embodiment of this application.

FIG. 8 is a flowchart of a symbol processing method according to another embodiment of this application. The method includes the following steps S810 to S840.

S810: Obtain a plurality of complex-valued symbols.

The plurality of complex-valued symbols may include a modulated symbol obtained by modulating an encoded bit stream.

Optionally, the plurality of complex-valued symbols may further include a reference signal sampling point. For example, the reference signal sampling point may include a PTRS sampling point.

S820: Divide the plurality of complex-valued symbols into a plurality of sets.

Each set may include several complex-valued symbols. For example, each set may be considered as one multidimensional time domain vector, and complex-valued symbols in the set may be considered as elements in the time domain vector.

Each set corresponds to one transmitted symbol. For example, each set corresponds to one DFT-s-OFDM symbol or SC-QAM symbol.

The plurality of sets include a first set corresponding to a first transmitted symbol and a second set corresponding to a second transmitted symbol, the first transmitted symbol and the second transmitted symbol are consecutive in time domain, and the first transmitted symbol is located before the second transmitted symbol.

Step S820 may correspond to step S320 shown in FIG. 5, FIG. 6, and FIG. 7.

S830: Perform a copy operation on the first set and the second set, so that both the first set and the second set have first complex-valued symbols. The first complex-valued symbol may include a plurality of complex-valued symbols.

In this specification, a subset including the first complex-valued symbols in the first set is referred to as a first subset, and a subset including the first complex-valued symbols in the second set is referred to as a second subset.

In step S830, through the copy operation, the first set includes the first subset, the second set includes the second subset, and complex-valued symbols included in the first subset and the second subset are the same. A time domain location of the first subset may be the same as or different from a time domain location of the second subset.

Optionally, in some embodiments, the time domain location of the first subset may be the same as the time domain location of the second subset, in other words, a time domain index of a start location of the first subset is the same as a time domain index of a start location of the second subset, and a time domain index of an end location of the first subset is the same as a time domain index of an end location of the second subset.

In this specification, the copy operation in step S830 in this embodiment is referred to as a co-location copy operation.

That the copy operation in step S830 is a co-location copy operation mentioned below means that through the copy operation in step S830, both the first set and the second set have the first complex-valued symbols, and the time domain location of the first subset including the first complex-valued symbols in the first set is the same as the time domain location of the second subset including the first complex-valued symbols in the second set.

Optionally, in an implementation, the first subset and the second subset have a same length, but do not have a same index. For example, the time domain location of the first subset is different from the time domain location of the second subset. In this case, in a subsequent processing step, a transmitter may adjust the first subset and the second subset to a same time domain location by performing processing such as a time domain cyclic shift or frequency domain weighting. This is equivalent to co-location copying.

It should be noted that the copy operation performed on the first set and the second set in step S830 may also be understood as mapping the first complex-valued symbols in the first set and the second set.

Step S830 may correspond to step S340 shown in FIG. 5, FIG. 6, and FIG. 7.

It should be understood that, in the application scenario 1, step S830 is performed before DFT, and in the application scenario 2, step S830 is performed before a CP is added.

The copy operation in step S830 may be forward copying or backward copying.

Optionally, in the embodiment shown in FIG. 8, step S830 includes: copying the first complex-valued symbols in the first set into the second set. This copying manner may be referred to as backward copying.

Optionally, in the embodiment shown in FIG. 8, step S830 includes: copying the first complex-valued symbols in the second set into the first set. This copying manner may be referred to as forward copying.

S840: Perform signal processing on the first set and the second set obtained through the copy operation, where the signal processing includes a cyclic shift or frequency domain weighting.

It should be understood that if the signal processing in step S840 is a cyclic shift, in step S840, signal processing is performed on a time domain signal corresponding to the first set and a time domain signal corresponding to the second set; or if the signal processing in step S840 is frequency domain weighting, in step S840, frequency domain weighting is performed on a frequency domain signal corresponding to the first set and a frequency domain signal corresponding to the second set.

There are a plurality of implementations of step S840.

Optionally, in a first implementation, the signal processing in step S840 includes first signal processing, and the first signal processing includes a cyclic shift or frequency domain weighting.

In the first implementation, step S840 includes: separately performing first signal processing on the first set and the second set obtained through the copy operation, where through the first signal processing, the end location of the first subset corresponds to a first reference point of the first transmitted symbol, and the end location of the second subset corresponds to a second reference point of the second transmitted symbol. The first reference point represents an end location of a transmitted symbol, and the second reference point represents a location from which a CP is obtained through truncation in a transmitted symbol. The first reference point represents an end location of a transmitted symbol, and the second reference point represents a location from which a CP is obtained through truncation in a transmitted symbol.

In this embodiment, a copy operation is performed on the first set and the second set corresponding to the first transmitted symbol and the second transmitted symbol that are consecutive in time domain, so that both the first set and the second set have the first complex-valued symbols. First signal processing is performed on the first set and the second set, so that the end location of the first subset including the first complex-valued symbols in the first set corresponds to the first reference point of the first transmitted symbol, and the end location of the second subset in the second set corresponds to the second reference point of the second transmitted symbol. This generates the first transmitted symbol and the second transmitted symbol whose time domain structures are shown in FIG. 3. Therefore, in this embodiment of this application, a guard interval between symbols can be flexibly configured when a CP length is fixed.

Optionally, in a second implementation, the signal processing in step S840 includes first signal processing and second signal processing, the first signal processing includes a cyclic shift or frequency domain weighting, and the second signal processing includes a cyclic shift or frequency domain weighting. If the first signal processing is a cyclic shift, the second signal processing is a cyclic shift; or if the first signal processing is frequency domain weighting, the second signal processing may be frequency domain weighting or a cyclic shift.

In the second implementation, step S840 includes: separately performing first signal processing on the first set and the second set obtained through the copy operation, where through the first signal processing, the end location of the first subset corresponds to a first reference point of the first transmitted symbol, and the end location of the second subset corresponds to a second reference point of the second transmitted symbol; and simultaneously performing second signal processing on a signal obtained by performing first signal processing on the first set and a signal obtained by performing first signal processing on the second set, where through the second signal processing, the start location of the first subset corresponds to a location preceding the first reference point of the first transmitted symbol, the end location of the first subset corresponds to a location following the first reference point of the first transmitted symbol, the start location of the second subset corresponds to a location preceding the second reference point of the second transmitted symbol, and the end location of the second subset corresponds to a location following the second reference point of the second transmitted symbol. The first reference point represents an end location of a transmitted symbol, and the second reference point represents a location from which a CP is obtained through truncation in a transmitted symbol.

In the second implementation, the second signal processing may be understood as a common shift operation on the first set and the second set.

In this embodiment of this application, a copy operation is performed on the first set and the second set corresponding to the first transmitted symbol and the second transmitted symbol that are consecutive in time domain, so that both the first set and the second set have the first complex-valued symbols. First signal processing and second signal processing are performed on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol. This generates the first transmitted symbol and the second transmitted symbol whose time domain structures are shown in FIG. 3. Therefore, in this embodiment of this application, a guard interval between symbols can be flexibly configured when a CP length is fixed.

In addition, it should be understood that impact on extension of a guard interval between symbols that is caused by an effect of filtering can be reduced to some extent by performing first signal processing and second signal processing on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol.

It should be noted that, that "the start location of the first subset corresponds to the location preceding the first reference point of the first transmitted symbol, and the end location of the first subset corresponds to the location following the first reference point of the first transmitted symbol" mentioned in this specification means that the start location of the first subset in the first set corresponds to a tail location of the first transmitted symbol, and the end location of the first subset corresponds to a header location of the first transmitted symbol.

Figure 11:
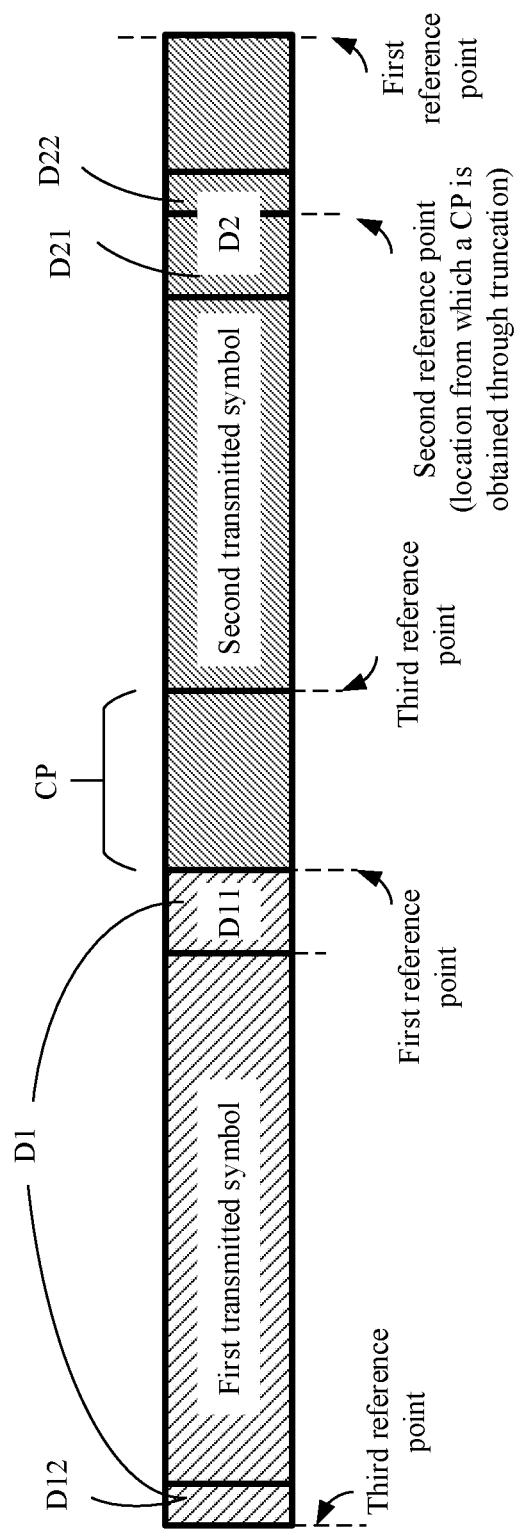
FIG. 11 is a diagram of a time domain structure of a transmitted symbol according to an embodiment of this application.

That "the start location of the first subset corresponds to the location preceding the first reference point of the first transmitted symbol, and the end location of the first subset corresponds to the location following the first reference point of the first transmitted symbol" mentioned in this specification exists on a premise that signal processing is performed on the first set, in other words, a cyclic shift or frequency domain weighting is performed on the first set. It should be understood that, on the premise of a cyclic shift (or frequency domain weighting), that "the end location of the first subset corresponds to the location following the first reference point of the first transmitted symbol" may mean that "the end location of the first subset corresponds to the header location of the first transmitted symbol", or "the end location of the first subset corresponds to a location following a third reference point of the first transmitted symbol, where the third reference point represents a start location of a transmitted symbol". Alternatively, in terms of a time domain structure of the first transmitted symbol, that "the end location of the first subset corresponds to the location following the first reference point of the first transmitted symbol" may be expressed as follows: "The end location of the first subset corresponds to the location preceding the first reference point of the first transmitted symbol", as shown in FIG. 11.

It should be further noted that, in this specification, to illustrate that a time domain location that is in the first transmitted symbol and that corresponds to the time domain location of the first subset overlaps the first reference point (namely, an end location of the first transmitted symbol) of the first transmitted symbol, the following description manner is used: "The start location of the first subset corresponds to the location preceding the first reference point of the first transmitted symbol, and the end location of the first subset corresponds to the location following the first reference point of the first transmitted symbol".

Optionally, in a third implementation, the signal processing in step S840 includes third signal processing, and the third signal processing includes a cyclic shift or frequency domain weighting.

In the third implementation, step S840 includes: separately performing third signal processing on the first set and the second set obtained through the copy operation, where through the third signal processing, the start location of the first subset corresponds to a location preceding a first reference point of the first transmitted symbol, the end location of the first subset corresponds to a location following the first reference point of the first transmitted symbol, the start location of the second subset corresponds to a location preceding a second reference point of the second transmitted symbol, and the end location of the second subset corresponds to a location following the second reference point of the second transmitted symbol. The first reference point represents an end location of a transmitted symbol, and the second reference point represents a location from which a CP is obtained through truncation in a transmitted symbol.

It should be understood that the third implementation may be considered as a result of combining the first signal processing and the second signal processing in the second implementation into one time of signal processing. Both the first signal processing and the second signal processing are cyclic shifts, or both the first signal processing and the second signal processing are frequency domain weighting.

In this embodiment of this application, a copy operation is performed on the first set and the second set corresponding to the first transmitted symbol and the second transmitted symbol that are consecutive in time domain, so that both the first set and the second set have the first complex-valued symbols. Third signal processing is performed on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol. This generates the first transmitted symbol and the second transmitted symbol whose time domain structures are shown in FIG. 3. Therefore, in this embodiment of this application, a guard interval between symbols can be flexibly configured when a CP length is fixed.

In addition, it should be understood that impact on extension of a guard interval between symbols that is caused by an effect of filtering can be reduced to some extent by performing third signal processing on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol.

Figure 9:
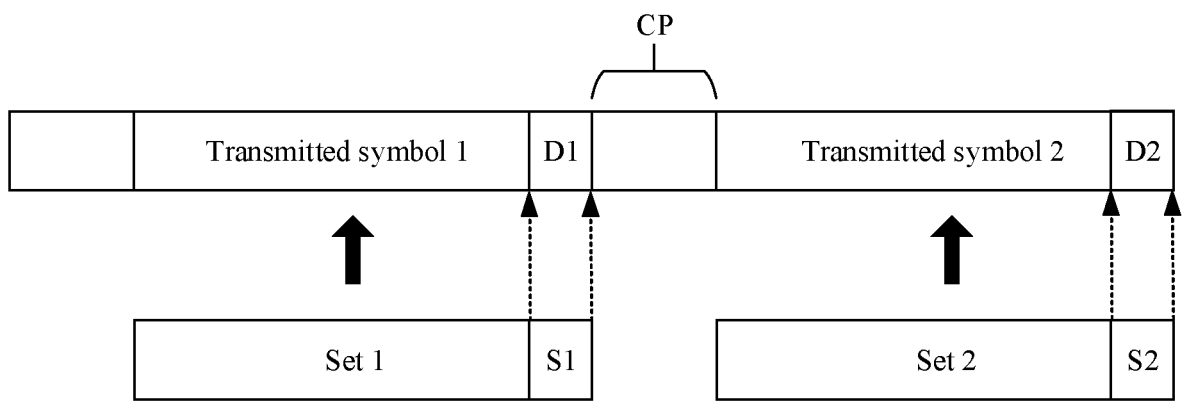
FIG. 9 is a diagram of a correspondence between a set and a transmitted symbol when no cyclic shift is performed according to an embodiment of this application.
Figure 10:
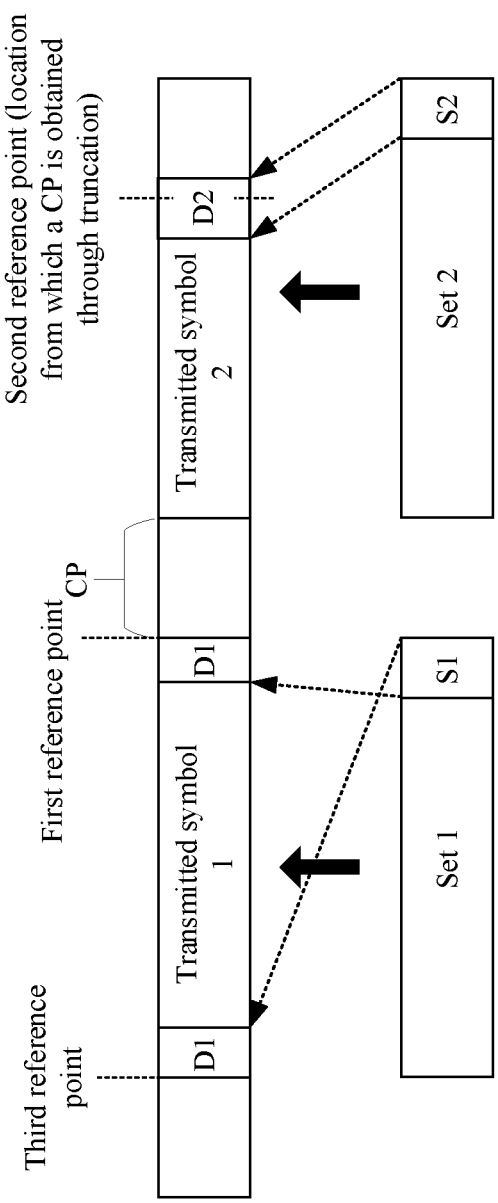
FIG. 10 is a diagram of a correspondence between a set and a transmitted symbol when a cyclic shift is performed according to an embodiment of this application.

As an example instead of a limitation, the following provides example descriptions with reference to FIG. 9 and FIG. 10. In FIG. 9 and FIG. 10, a set 1 corresponds to a transmitted symbol 1, and a set 2 corresponds to a transmitted symbol 2.

FIG. 9 shows a correspondence between a set and a transmitted symbol when step S840 is not performed.

In FIG. 9, the set 1 and the set 2 are sets obtained through a copy operation (that is, step S830 in this embodiment of this application). Both the set 1 and the set 2 include first complex-valued symbols, and the first complex-valued symbol may include a plurality of complex-valued symbols. A subset including the first complex-valued symbols in the set 1 is a subset S1 shown in FIG. 9, and a subset including the first complex-valued symbols in the set 2 is a subset S2 shown in FIG. 9. Time domain locations of the subset S1 and the subset S2 are the same, in other words, start locations of the subset S1 and the subset S2 are the same, and end locations of the subset S1 and the subset S2 are also the same.

In FIG. 9, the transmitted symbol 1 represents a transmitted symbol generated based on the set 1 when step S840 is not performed, and the transmitted symbol 2 represents a transmitted symbol generated based on the set 2 when step S840 is not performed. A symbol component D1 in the transmitted symbol 1 is the same as a symbol component D2 in the transmitted symbol 2, and time domain locations of the symbol component D1 and the symbol component D2 are the same. The subset S1 in the set 1 corresponds to the symbol component D1 in the transmitted symbol 1, and the subset S2 in the set 2 corresponds to the symbol component D2 in the transmitted symbol 2.

It can be learned from FIG. 9 that because the transmitted symbol 1 represents a transmitted symbol generated based on the set 1 when step S840 is not performed, and the transmitted symbol 2 represents a transmitted symbol generated based on the set 2 when step S840 is not performed, a location of the symbol component D1 in the transmitted symbol 1 is not shifted relative to a location of the subset S1 in the set 1, and a location of the symbol component D2 in the transmitted symbol 2 is not shifted relative to a location of the subset S2 in the set 2.

FIG. 10 shows a correspondence between a set and a transmitted symbol when step S840 is performed. In an example of FIG. 10, an implementation of step S840 is the foregoing second implementation or the foregoing third implementation.

In FIG. 10, the set 1 and the set 2 are sets obtained through copying (that is, step S830 in this embodiment of this application). Both the set 1 and the set 2 include first complex-valued symbols, and the first complex-valued symbol may include a plurality of complex-valued symbols. A subset including the first complex-valued symbols in the set 1 is a subset S1 shown in FIG. 10, and a subset including the first complex-valued symbols in the set 2 is a subset S2 shown in FIG. 10. Time domain locations of the subset S1 and the subset S2 are the same, in other words, start locations of the subset S1 and the subset S2 are the same, and end locations of the subset S1 and the subset S2 are also the same.

In FIG. 10, the transmitted symbol 1 represents a transmitted symbol generated based on the set 1 when step S840 is performed, and the transmitted symbol 2 represents a transmitted symbol generated based on the set 2 when step S840 is performed. A symbol component D1 in the transmitted symbol 1 is the same as a symbol component D2 in the transmitted symbol 2, a start location of the symbol component D1 is located before a first reference point of the transmitted symbol 1, and an end location of the symbol component D1 is located after the first reference point of the transmitted symbol 1 (in other words, is located at a header of the transmitted symbol 1), in other words, the end location of the symbol component D1 is located after a third reference point of the transmitted symbol 1, as shown in FIG. 10. A start location of the symbol component D2 is located before a second reference point of the transmitted symbol 2, and an end location of the symbol component D2 is located after the second reference point of the transmitted symbol 2. The first reference point represents an end location of a transmitted symbol, and the second reference point represents a location from which a CP is obtained through truncation in a transmitted symbol, in other words, a distance between the second reference point and the first reference point is equal to a CP length. The third reference point represents a start location of a transmitted symbol. The symbol component D1 in the transmitted symbol 1 corresponds to the subset S1 in the set 1, and the symbol component D2 in the transmitted symbol 2 corresponds to the subset S2 in the set 2.

It can be learned from FIG. 10 that because the transmitted symbol 1 represents a transmitted symbol generated based on the set 1 when step S840 is performed, and the transmitted symbol 2 represents a transmitted symbol generated based on the set 2 when step S840 is performed, a location of the symbol component D1 in the transmitted symbol 1 is shifted relative to a location of the subset S1 in the set 1, and a location of the symbol component D2 in the transmitted symbol 2 is shifted relative to a location of the subset S2 in the set 2.

For example, in this embodiment of this application, the first set may correspond to the set 1 in FIG. 10, the second set may correspond to the set 2 in FIG. 10, the first transmitted symbol may correspond to the transmitted symbol 1 in FIG. 10, and the second transmitted symbol may correspond to the transmitted symbol 2 in FIG. 10.

For example, step S840 includes first signal processing and second signal processing. Time domain structures of the first transmitted symbol corresponding to the first set and the second transmitted symbol corresponding to the second set in this embodiment of this application are shown in FIG. 11. In FIG. 11, a symbol component D1 in the first transmitted symbol is the same as a symbol component D2 in the second transmitted symbol, a start location of the symbol component D1 is located before the first reference point of the first transmitted symbol, an end location of the symbol component D1 is located after the first reference point of the first transmitted symbol (in other words, is located at a header of the first transmitted symbol), a start location of the symbol component D2 is located before the second reference point of the second transmitted symbol, and an end location of the symbol component D2 is located after the second reference point of the second transmitted symbol.

In FIG. 11, a symbol component that is in the symbol component D1 and that is located before the first reference point of the first transmitted symbol is denoted as D11, and a symbol component that is in the symbol component D1 and that is located after the first reference point of the first transmitted symbol (namely, a symbol component located after the third reference point) is denoted as D12. A symbol component that is in the symbol component D2 and that is located before the second reference point of the second transmitted symbol is denoted as D21, and a symbol component that is in the symbol component D2 and that is located after the second reference point of the second transmitted symbol is denoted as D22. It can be learned with reference to FIG. 3 and FIG. 11 that the symbol component D11 in the first transmitted symbol shown in FIG. 11 corresponds to the symbol component D1 in the first transmitted symbol shown in FIG. 3, and the symbol component D21 in the second transmitted symbol shown in FIG. 11 corresponds to the symbol component D2 in the second transmitted symbol shown in FIG. 3.

In this embodiment of this application, a copy operation, first signal processing, and second signal processing are performed on two sets corresponding to two transmitted symbols that are consecutive in time domain, so that the first transmitted symbol and the second transmitted symbol whose time domain structures are shown in FIG. 11 can be generated. Therefore, in this embodiment of this application, a guard interval between symbols can be flexibly configured when a CP length is fixed.

In addition, it should be understood that impact on extension of a guard interval between symbols that is caused by an effect of filtering can be reduced to some extent by performing first signal processing and second signal processing on the first set and the second set, so that the start location and the end location of the first subset respectively correspond to the locations preceding and following the first reference point of the first transmitted symbol, and the start location and the end location of the second subset respectively correspond to the locations preceding and following the second reference point of the second transmitted symbol.

For ease of understanding and description, in this application, the first transmitted symbol and the second transmitted symbol that are consecutive in time domain are used as examples for description. It should be understood that the symbol processing method provided in this application is applicable to any two or more transmitted symbols that are consecutive in time domain in a signal stream transmitted by a transmit end.

An execution occasion of step S840 in this embodiment of this application may vary with an application scenario.

In the application scenario 1, the execution occasion of step S840 may include 1, 2, or 3 shown in FIG. 6.

Optionally, in the embodiment shown in FIG. 8, the transmitted symbol is a DFT-s-OFDM symbol, the signal processing in step S840 includes a cyclic shift, and step S840 includes the following operations: performing frequency domain processing on the first set and the second set to obtain a frequency domain signal corresponding to the first set and a frequency domain signal corresponding to the second set; performing IFFT on the frequency domain signal corresponding to the first set and the frequency domain signal corresponding to the second set, to obtain a time domain signal corresponding to the first set and a time domain signal corresponding to the second set; and performing a cyclic shift on the time domain signal corresponding to the first set and the time domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This embodiment corresponds to performing step S840 on the occasion shown in 3 in FIG. 6. Performing frequency domain processing on the first set and the second set is performing DFT on the first set and the second set.

Figure 12:
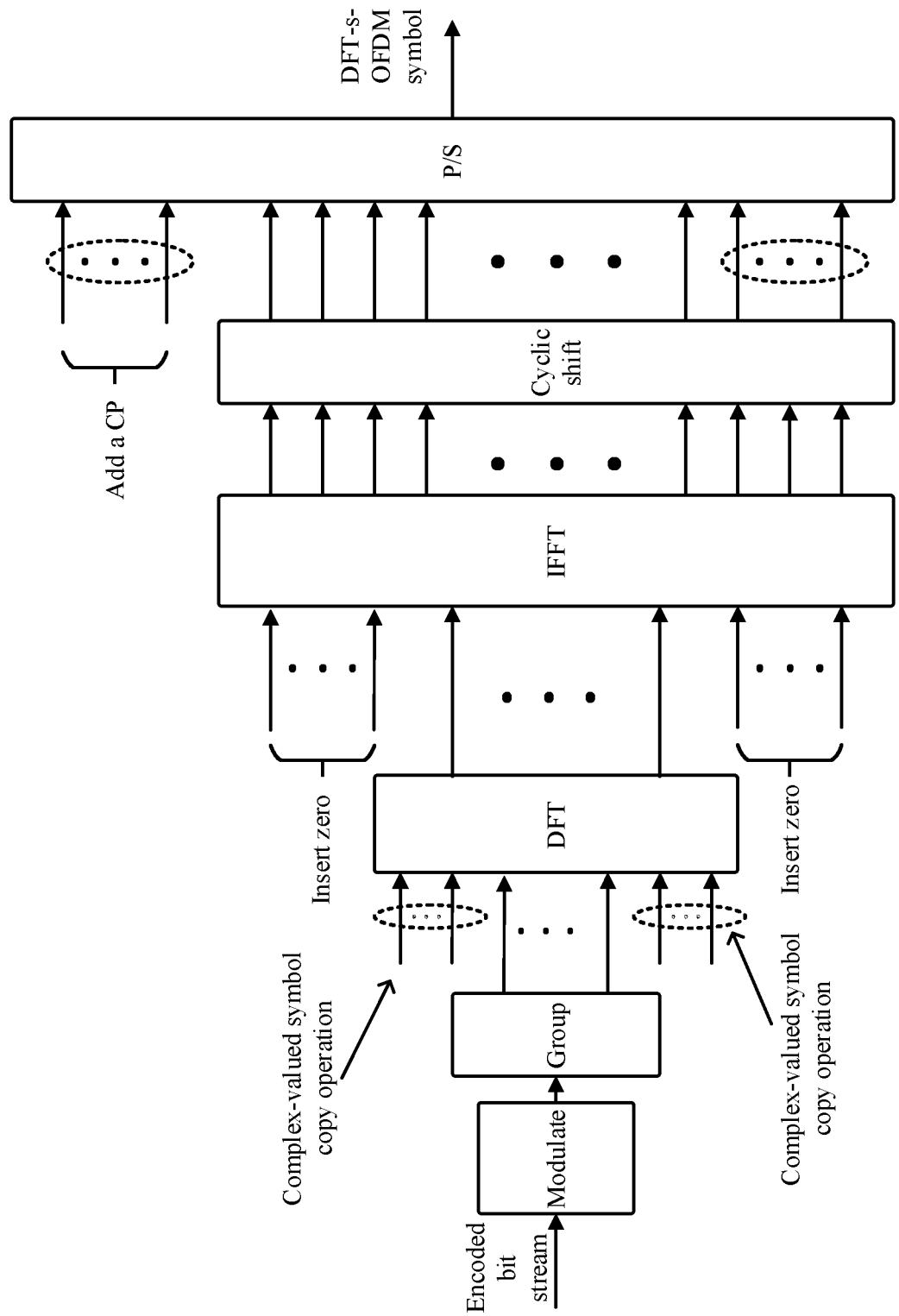
FIG. 12 is a flowchart of symbol processing according to an embodiment of this application.

For example, the transmitted symbol is a DFT-s-OFDM symbol, and a procedure of generating the DFT-s-OFDM symbol in this application is shown in FIG. 12. The procedure includes the following steps: modulating an encoded bit stream to obtain a plurality of modulated symbols, where the modulated symbol may be referred to as a complex-valued symbol, and this step may correspond to step S810 in this embodiment; grouping the plurality of complex-valued symbols to obtain a plurality of sets, where this step corresponds to step S820 in this embodiment; performing a complex-valued symbol copy operation on the plurality of sets, where this step may correspond to step S830 in this embodiment; performing DFT on a signal obtained through the copy operation; mapping M-point frequency domain elements obtained through the DFT to M consecutive subcarriers (not shown in FIG. 12), where the transmitter inserts zero into subcarriers other than the M subcarriers or maps other signals to subcarriers other than the M subcarriers; performing IFFT on a frequency domain signal after the subcarrier mapping; performing a cyclic shift on a signal obtained through the IFFT, where this step may correspond to step S840 in this embodiment; and adding a CP to a signal obtained through the cyclic shift, and performing parallel/serial (P/S) conversion to finally obtain a DFT-s-OFDM symbol.

For example, the grouping in this embodiment of this application may be implemented through serial/parallel (S/P) conversion.

Optionally, in the embodiment shown in FIG. 8, the transmitted symbol is a DFT-s-OFDM symbol, the signal processing in step S840 includes frequency domain weighting, and step S840 includes the following operations: performing DFT on the first set and the second set to obtain a frequency domain signal corresponding to the first set and a frequency domain signal corresponding to the second set; and performing frequency domain weighting on the frequency domain signal corresponding to the first set and the frequency domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

It should be understood that the frequency domain weighting in this embodiment may be equivalent to a cyclic shift of a time domain symbol.

This embodiment corresponds to performing a cyclic shift on the occasion shown in 2 in FIG. 6.

For example, the transmitted symbol is a DFT-s-OFDM symbol, and a procedure of generating the DFT-s-OFDM symbol in this application includes the following steps: modulating an encoded bit stream to obtain a plurality of modulated symbols, where the modulated symbol may be referred to as a complex-valued symbol, and this step may correspond to step S810 in this embodiment; grouping the plurality of complex-valued symbols to obtain a plurality of sets, where this step corresponds to step S820 in this embodiment; performing a complex-valued symbol copy operation on the plurality of sets, where this step may correspond to step S830 in this embodiment; performing DFT on a signal obtained through the copy operation; performing the foregoing frequency domain weighting on M-point frequency domain elements obtained through the DFT; mapping the M-point frequency domain elements obtained through the frequency domain weighting to M consecutive subcarriers, where the transmitter inserts zero into subcarriers other than the M subcarriers or maps other signals to subcarriers other than the M subcarriers; performing IFFT on a frequency domain signal after the subcarrier mapping; performing a cyclic shift on a signal obtained through the IFFT, where this step may correspond to step S840 in this embodiment; and adding a CP to a signal obtained through the cyclic shift to finally obtain a DFT-s-OFDM symbol.

It should be understood that in this embodiment, a cyclic shift is equivalently implemented through frequency domain weighting.

For example, when frequency domain weighting is performed on the frequency domain signal corresponding to the first set and the frequency domain signal corresponding to the second set, a weight used meets the following formula:

$$C(k,l) = C_0(l) \cdot \exp(j2\pi k n_0(l)/P), \text{ where}$$

$C(k, l)$ represents the weight. $C_0(l)$ is related to a symbol number l, and is a constant for one transmitted symbol. A specific value of $C_0(l)$ is not limited in this application. Optionally, $C_0(l)=1$. j represents a complex-valued symbol, that is, $j=\sqrt{-1}$.

P includes two possible values: $P=N_u$ or $P=M$, where $N_u$ represents a length of a symbol except a CP after IFFT, and M represents a quantity of points of DFT.

Assuming that a shift value obtained through IFFT is a CP length, namely, $N_{CP,l}$, an equivalent parameter value of frequency domain weighting is as follows: $n_0(l)=N_{CP,l}$ when $P=N_u$; or $n_0(l)=M \cdot N_{CP,l}/N_u$ when $P=M$.

A shift value of a transmitted symbol whose symbol number is l is $N_1+\Sigma_{o=o1}^{l} N_{CP,o}$; and $n_0(l)=N_1\Sigma_{o=o1}^{l} N_{CP,o}$ when $P=N_u$; or $n_0(l)=n_0(l)+M \cdot \Sigma_{o=o1}^{l} N_{CP,o}/N_u$ when $P=M$.

o1 represents a start symbol for cumulation, and a value of o1 may be 0, 1, 2, or the like. $N_1$ represents an initial shift value, and $N_1$ may be set.

Correspondingly, it can be learned that $n_0(l)=M \cdot N_1/N_u$.

Optionally, a value of $n_0(1)$ may be calculated by using $N_1$.

Optionally, a value of $n_0(1)$ may be directly defined by using a protocol.

Optionally, in some embodiments, an equivalent shift value of a transmitted symbol whose symbol number is l+1 is $N_{CP,l+1}$ larger than an equivalent shift value of the transmitted symbol whose symbol number is l.

It may be understood that the following may be obtained:

$$\frac{C(k,l+1)}{C(k,l)} = \frac{C_0(l+1)}{C_0(l)}\exp(j2\pi k N_{CP,l+1}/N_u)$$

Optionally, a value of $N_{CP,l}/N_u$ may be directly defined by using a protocol.

For example, a possible value is $$\frac{N_{CP,l}}{N_u} = \frac{144}{2048}$$

in an existing NR protocol.

In the application scenario 2, a cyclic shift is performed after a copy operation and before a CP is added, for example, on an occasion shown in 4 in FIG. 7.

Optionally, in the embodiment shown in FIG. 8, the transmitted symbol is a DFT-s-OFDM symbol or an SC-QAM symbol, the signal processing in step S840 includes a cyclic shift, and step S840 includes the following operations: directly performing a cyclic shift on the first set and the second set obtained in step S830, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

This embodiment may correspond to performing a cyclic shift on the occasion shown in 1 in FIG. 6, or this embodiment may correspond to performing a cyclic shift on the occasion shown in 4 in FIG. 7.

Optionally, in the embodiment in which a co-location copy operation is performed in step S830, in other words, step S830 includes performing a copy operation on the first set and the second set, so that both the first set and the second set have the first complex-valued symbols, and the time domain index of the start location of the first subset including the first complex-valued symbols in the first set is the same as the time domain index of the start location of the second subset including the first complex-valued symbols in the second set. The time domain index of the start location of the first subset is related to a CP length and a symbol number.

In other words, for two sets corresponding to two transmitted symbols that are consecutive in time domain, a location of a complex-valued symbol participating in a copy operation may be determined based on a symbol number of the transmitted symbol.

For example, in step S830, a co-location copy operation is performed on the first set and the second set. The time domain index i of the start location of the first subset meets the following formula:

$$i = A + CL_{CP}(l), \text{ where}$$

l represents a symbol number of the first set, where l=0 represents the 1$^{st}$ transmitted symbol in a signal stream, l=1 represents the 2$^{nd}$ transmitted symbol in the signal stream, and so on. A represents a time domain index of a first subset in a set whose symbol number l is 0. $CL_{CP}(l)$ represents an equivalent cumulative CP length of the first set whose symbol number is l, and represents an equivalent length, in a time domain vector before DFT, of a sum of CP lengths of a transmitted symbol whose symbol number is o1 to a transmitted symbol whose symbol number is l, where o1 represents a start symbol for cumulation, and a value of o1 may be 0, 1, 2, or the like.

CP lengths of transmitted symbols with different symbol numbers may be the same or different.

For example, the equivalent cumulative CP length $CL_{CP}(l)$ of the set whose symbol number is l meets the following formula:

$$CL_{CP}(l) = \left\lfloor M/N_u \sum_{o=o1}^{l} N_{cp,o} \right\rfloor,$$

where

M represents a quantity of points of DFT, $N_u$ represents a length of a symbol except a CP after IFFT, $N_{CP,o}$ represents a shift value (CP length) that is of a set whose symbol number is o and that is obtained through IFFT, o1 represents a start symbol for cumulation, a value of o1 may be 0, 1, 2, or the like, and $\lfloor\ \rfloor$ represents rounding down. Rounding down may be replaced with another rounding manner.

Optionally, in some embodiments, if CP lengths of transmitted symbols with different symbol numbers in a signal stream are the same, in the first set and the second set obtained through the copy operation, the time domain index i of the start location of the first subset meets the following formula:

$$i = A + l \cdot L_{CP}, \text{ where}$$

l represents a symbol number of the first set, where l=0 represents the 1$^{st}$ transmitted symbol in a signal stream, l=1 represents the 2$^{nd}$ transmitted symbol in the signal stream, and so on. A represents a time domain index of a first subset in a set whose symbol number l is 0. $L_{CP}$ represents an equivalent length of a CP length in a time domain vector before DFT.

It should be further understood that, in step S830, the time domain index of the start location of the first subset is the same as the time domain index of the start location of the second subset, and therefore the time domain index i of the start location of the second subset also meets the foregoing formula.

It should be understood that copy locations (namely, time domain indexes of copied symbol components) of performing a copy operation on two sets corresponding to two transmitted symbols whose symbol numbers are l and l+1 are different from copy locations of performing a copy operation on two sets corresponding to two transmitted symbols whose symbol numbers are l+1 and l+2.

Figure 13:
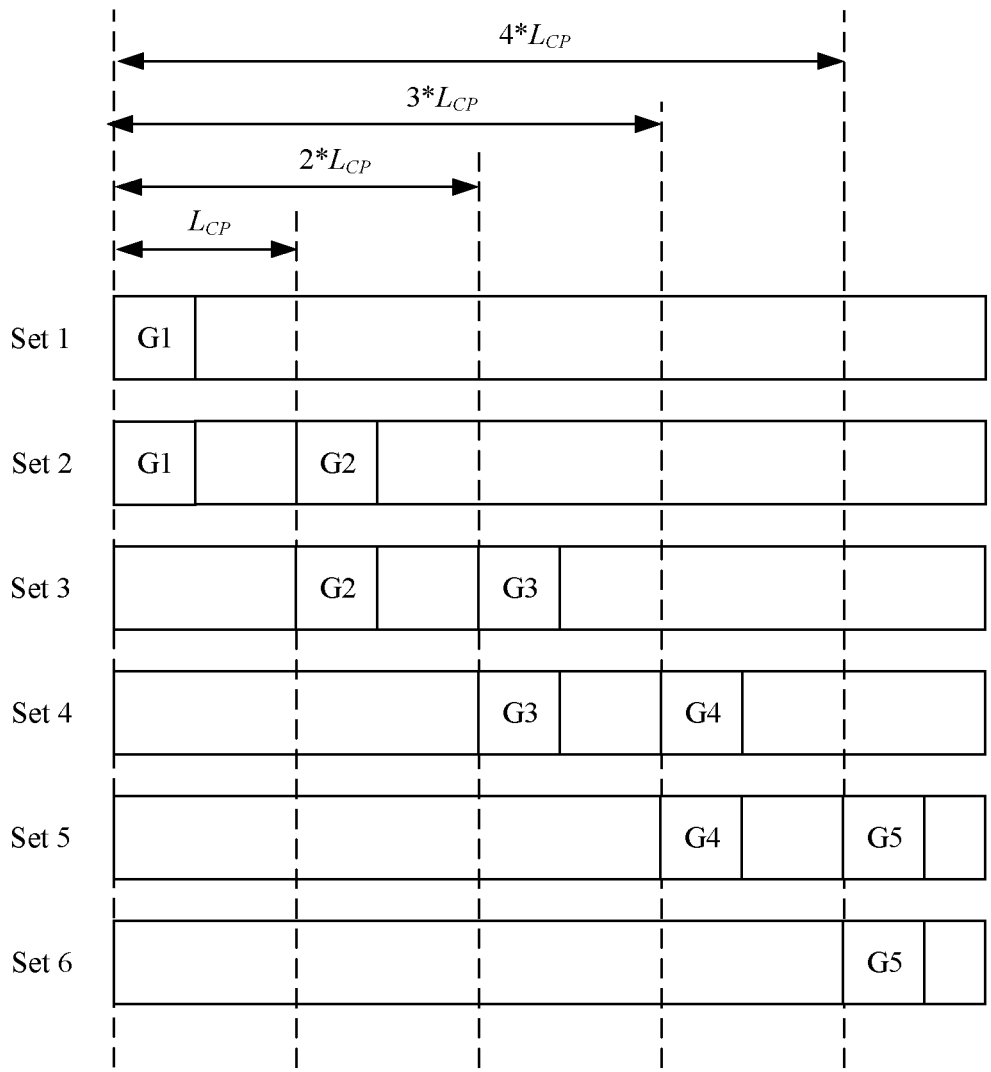
FIG. 13 is a diagram of performing a copy operation on a plurality of sets according to an embodiment of this application.

As an example instead of a limitation, FIG. 13 is a diagram of time domain structures obtained after a co-location copy operation is performed on a plurality of sets corresponding to a plurality of time domain symbols that are consecutive in time domain.

In FIG. 13, the following assumption is made: A symbol number of a set 1 is 0, a symbol number of a set 2 is 1, . . . , and a symbol number of a set 6 is 5. CP lengths of transmitted symbols corresponding to sets with different symbol numbers are the same. A time domain index A of a subset participating in a copy operation in the set 1 whose symbol number is 0 is 0.

As shown in FIG. 13, the set 1 and the set 2 each have a subset G1 including complex-valued symbols, and locations of the subset G1 in the set 1 and the set 2 are the same; the set 2 and the set 3 each have a subset G2, and locations of the subset G2 in the set 2 and the set 3 are the same; and so on. For the set 1 and the set 2, a time domain index of the subset G1 is 0. For the set 2 and the set 3, a time domain index of the subset G2 is $L_{CP}$. For the set 3 and the set 4, a time domain index of a subset G3 is i=A+l·$L_{CP}$=2$L_{CP}$. For the set 4 and the set 5, a time domain index of a subset G4 is i=A+l·$L_{CP}$=3$L_{CP}$. For the set 5 and the set 6, a time domain index of a subset G5 is i=A+l·$L_{CP}$=4$L_{CP}$. $L_{CP}$ represents an equivalent length of a CP length in a time domain vector before DFT.

Optionally, in some embodiments, step S830 includes: performing a copy operation on the first set and the second set, so that both the first set and the second set have first complex-valued symbols, and the time domain index of the start location of the first subset including the first complex-valued symbols in the first set is the same as the time domain index of the start location of the second subset including the first complex-valued symbols in the second set. The start location of the first subset corresponds to the location preceding the first reference point of the first transmitted symbol, the end location of the first subset corresponds to the location following the first reference point of the first transmission symbol (namely, a location following a third reference point of the first transmitted symbol), the start location of the second subset corresponds to the location preceding the first reference point of the second transmitted symbol, and the end location of the second subset corresponds to the location following the first reference point of the second transmitted symbol (namely, a location following a third reference point of the second transmitted symbol). The first reference point represents an end location of a transmitted symbol, the second reference point represents a location from which a CP is obtained through truncation in a transmitted symbol, and the third reference point represents a start location of a transmitted symbol.

In step S840 of this embodiment, no cyclic shift may be performed on the first set, and a cyclic shift may be performed only on the second set.

Optionally, in some embodiments, the signal processing in step S840 includes a cyclic shift, a cyclic shift step for the first set is determined based on a CP length and a symbol number of the first transmitted symbol, and a cyclic shift step for the second set is determined based on a CP length and a symbol number of the second transmitted symbol.

For example, l represents a symbol number of a transmitted symbol. It is assumed that l=0 corresponds to the 1$^{st}$ transmitted symbol in a signal stream, l=1 corresponds to the 2$^{nd}$ transmitted symbol in the signal stream, and so on. On the assumption, in step S840, a cyclic shift step Z(l) of the set whose symbol number is l meets the following formula:

$$Z(l) = Z_0 + \sum_{o=o1}^{l} N_{cp,o},$$

where $Z_0$ represents a cyclic shift step of the set whose symbol number is 0, and $$\sum_{o=o1}^{l} N_{cp,o}$$

represents an equivalent cumulative CP length of the set whose symbol number is l, and represents an equivalent length, in a time domain vector after IFFT, of a sum of CP lengths of a transmitted symbol whose symbol number is of to a transmitted symbol whose symbol number is l.

CP lengths of transmitted symbols with different symbol numbers may be the same or different.

Optionally, in some embodiments, CP lengths of transmitted symbols with different symbol numbers in a signal stream are the same, and a cyclic shift step Z(l) of a set whose symbol number is l meets the following formula:

$Z(l)=Z_0+l·N_{cp}$, where $Z_0$ represents a cyclic shift step of a set whose symbol number is 0, and the cyclic shift step of the set may be a preset value, for example, may be an empirical value. $N_{cp}$ represents an equivalent length of a CP length in a time domain vector after IFFT.

Figure 14:
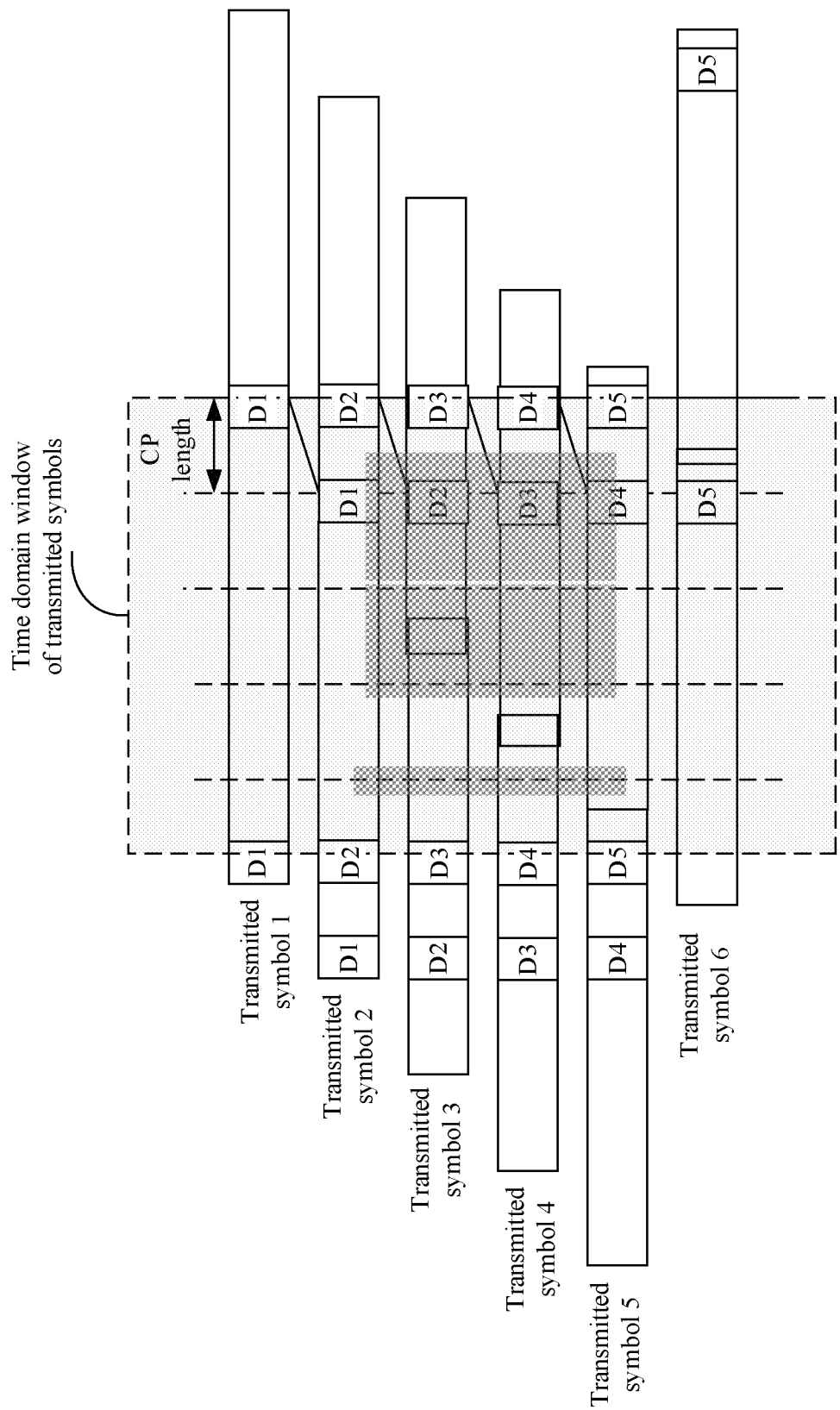
FIG. 14 is a diagram of performing a cyclic shift on a plurality of symbols according to an embodiment of this application.

FIG. 14 is a diagram of performing a copy operation and signal processing (a cyclic shift or frequency domain weighting) on a plurality of sets corresponding to a plurality of time domain symbols that are consecutive in time domain.

As an example instead of a limitation, six transmitted symbols located in a time domain window of transmitted symbols in FIG. 14 represent transmitted symbols that are consecutive in time domain and that are generated based on a set 1 to a set 6 obtained through processing of step S830 and step S840. In FIG. 14, a CP of the transmitted symbol is not considered. In FIG. 14, symbol numbers of a transmitted symbol 1 to a transmitted symbol 6 are sequentially 0, 1, . . . , and 5.

It should be noted that, in FIG. 14, the time domain window of transmitted symbols is drawn for better understanding of the cyclic shift. This time domain window is merely for ease of understanding and description, and does not constitute a limitation on this embodiment of this application.

It may be equivalently considered that the transmitted symbol 1 in FIG. 14 is a transmitted symbol obtained by performing signal processing (a cyclic shift or frequency domain weighting) on the set 1 in FIG. 13, the transmitted symbol 2 in FIG. 14 is a transmitted symbol obtained by performing signal processing (a cyclic shift or frequency domain weighting) on the set 2 in FIG. 13, . . . , and the transmitted symbol 6 in FIG. 14 is a transmitted symbol obtained by performing signal processing (a cyclic shift or frequency domain weighting) on the set 6 in FIG. 13.

It may be further understood from FIG. 14 that there is a difference of one CP length between a cyclic shift step of a transmitted symbol whose symbol number is l+1 and a cyclic shift step of a transmitted symbol whose symbol number is l. Herein, it is assumed that CP lengths of transmitted symbols with different symbol numbers are the same.

This embodiment of this application may be applied to generating a DFT-s-OFDM symbol and an SC-QAM symbol. In addition, this application may be further applied to generating a reference signal such as a DMRS.

For a DFT-s-OFDM waveform, a reference signal is usually generated in frequency domain, and subcarrier mapping is directly performed.

In an implementation, when the transmitted symbol is a reference signal, the copy operation in this embodiment of this application is performed after a sampling value of a time domain sequence converted from a reference signal frequency domain sequence is calculated.

Considering that the reference signal is used to estimate a channel, to ensure channel performance, a time domain sampling point including another symbol is not desirable in the reference signal.

Optionally, in this embodiment of this application, if a transmitted symbol x is a reference signal, and transmitted symbols preceding and following the transmitted symbol x are non-reference signals, forward copying is performed in step S830 for transmitted symbols preceding the transmitted symbol x (including the reference signal x), and backward copying is performed in step S830 for reference signals following the transmitted symbol x (including the reference signal x).

Optionally, in the foregoing embodiments of backward copying, the first transmitted symbol may be a reference signal, and the second transmitted symbol is a non-reference signal.

For example, the first transmitted symbol is a DMRS.

Optionally, in the foregoing embodiments of forward copying, the first transmitted symbol is a non-reference signal, and the second transmitted symbol may be a reference signal.

For example, the second transmitted symbol is a DMRS.

In this embodiment, a guard interval between symbols can be flexibly configured, and integrity of a reference signal can also be ensured.

Figure 15:
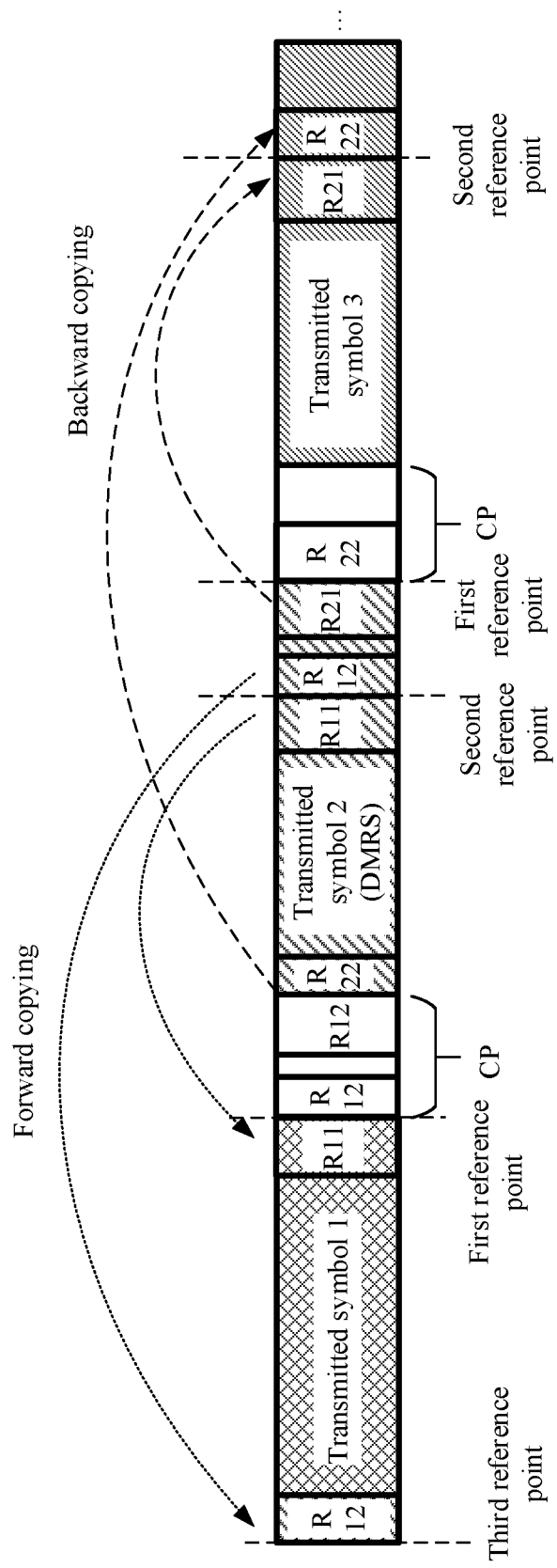
FIG. 15 is a diagram of a time domain structure of a transmitted symbol according to an embodiment of this application.

FIG. 15 is a diagram of time domain structures of three transmitted symbols (1, 2, and 3). The transmitted symbol 2 is a DMRS, the transmitted symbol 1 and the transmitted symbol 2 are non-reference signals, a copy relationship between a set 2 corresponding to the transmitted symbol 2 and a set 1 corresponding to the transmitted symbol 1 is forward copying, and a copy relationship between the set 2 corresponding to the transmitted symbol 2 and a set 3 corresponding to the transmitted symbol 3 is backward copying.

It can be learned from FIG. 15 that a symbol component R12 whose start location is a second reference point in the transmitted symbol 2 is copied into the transmitted symbol 1, a start location of the symbol component R12 copied into the transmitted symbol 1 is a third reference point of the transmitted symbol 1, a symbol component R11 whose end location is the second reference point in the transmitted symbol 2 is copied into the transmitted symbol 1, and an end location of the symbol component R11 copied into the transmitted symbol 1 is a first reference point of the transmitted symbol 1. A symbol component R21 whose end location is a first reference point in the transmitted symbol 2 is copied into the transmitted symbol 3, an end location of the symbol component R21 copied into the transmitted symbol 3 is a second reference point of the transmitted symbol 3, a symbol component R22 whose start location is a third reference point in the transmitted symbol 2 is copied into the transmitted symbol 3, and a start location of the symbol component R22 copied into the transmitted symbol 3 is the second reference point of the transmitted symbol 3. The first reference point represents an end location of a transmitted symbol, the second reference point represents a location from which a CP is obtained through truncation in a transmitted symbol, and the third reference point represents a start location of a transmitted symbol (an end location of a CP), as shown in FIG. 15.

As shown in FIG. 15, the copy relationship between the transmitted symbol 2 and the transmitted symbol 1 is forward copying. The symbol components R11 and R12 in the DMRS are copied into the symbol 1, and by analogy, a symbol component D0 in the transmitted symbol 1 is copied into a symbol (not shown in FIG. 15) preceding the symbol 1. The copy relationship between the DMRS and the transmitted symbol 3 is backward copying. The symbol components R21 and R22 in the DMRS are copied into the transmitted symbol 3, and by analogy, a symbol component in the transmitted symbol 3 is copied into a symbol (not shown in FIG. 15) following the transmitted symbol 3.

It should be understood that, in this embodiment, a guard interval between symbols can be flexibly configured, and accuracy of a reference signal can also be ensured, so that channel performance can be ensured.

When two or more transmitted symbols that are consecutive in time domain are reference signals, this application provides a symbol processing method. The method includes the following steps.

Step (1): Obtain a plurality of complex-valued symbols.

Step (2): Divide the plurality of complex-valued symbols into a plurality of sets, where the plurality of sets include a first set and a second set, the first set corresponds to a first transmitted symbol, the second set corresponds to a second transmitted symbol, the first transmitted symbol and the second transmitted symbol are consecutive in time domain, the first transmitted symbol is located before the second transmitted symbol, and complex-valued symbols in a first subset in the first set are the same as complex-valued symbols in a second subset in the second set.

For example, a time domain vector corresponding to the first set is the same as a time domain vector corresponding to the second set.

Step (3): Perform signal processing on the first set and the second set, where the signal processing includes a cyclic shift or frequency domain weighting, and through the signal processing, a start location of the first subset corresponds to a location preceding a first reference point of the first transmitted symbol, an end location of the first subset corresponds to a location following the first reference point of the first transmitted symbol, a start location of the second subset corresponds to a location preceding a second reference point of the second transmitted symbol, and an end location of the second subset corresponds to a location following the second reference point of the second transmitted symbol. The first reference point represents an end location of a transmitted symbol, and the second reference point represents a location from which a CP is obtained through truncation in a transmitted symbol.

Optionally, the transmitted symbols corresponding to the first set and the second set are reference signals such as DMRSs.

It should be understood that, in this embodiment, no copy operation is performed on the first set and the second set, and when the transmitted symbols corresponding to the first set and the second set are reference signals, a guard interval between the reference signals can be flexibly configured while accuracy of the reference signals is ensured.

Based on the foregoing descriptions, in this embodiment of this application, the first transmitted symbol and the second transmitted symbol whose time domain structures are shown in FIG. 3 can be generated by performing a copy operation and signal processing including a cyclic shift or frequency domain weighting on two sets corresponding to two transmitted symbols that are consecutive in time domain. Therefore, in this embodiment of this application, a guard interval between symbols can be flexibly configured when a CP length is fixed.

Optionally, in the embodiment shown in FIG. 8, the method further includes: generating the first transmitted symbol and the second transmitted symbol based on signals obtained through the signal processing in step S840. A symbol component whose end location is the first reference point in the first transmitted symbol is the same as a symbol component whose end location is the second reference point in the second transmitted symbol.

In this application, for the first transmitted symbol and the second transmitted symbol that are consecutive in time domain, the symbol component whose end location is the first reference point in the first transmitted symbol and the symbol component whose end location is the second reference point in the second transmitted symbol are enabled to be the same, so that a guard interval between symbols can be flexibly configured by controlling a length of the symbol component.

Therefore, in this application, when a CP length is fixed, a guard interval between symbols can be flexibly configured, and a length of the guard interval can also be flexibly configured based on a user requirement.

It should be understood that, in addition to the embodiments provided in this specification, any other solution that can generate transmitted symbols whose time domain structures are shown in FIG. 3 falls within the protection scope of this application.

The embodiments described in this specification may be independent solutions, or may be combined based on internal logic. These solutions all fall within the protection scope of this application.

It may be understood that, in the foregoing method embodiments, an execution body may be a terminal device or a component (for example, a chip or a circuit) that may be used in a terminal device, or may be a network device or a component (for example, a chip or a circuit) that may be used in a network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

Figure 16:
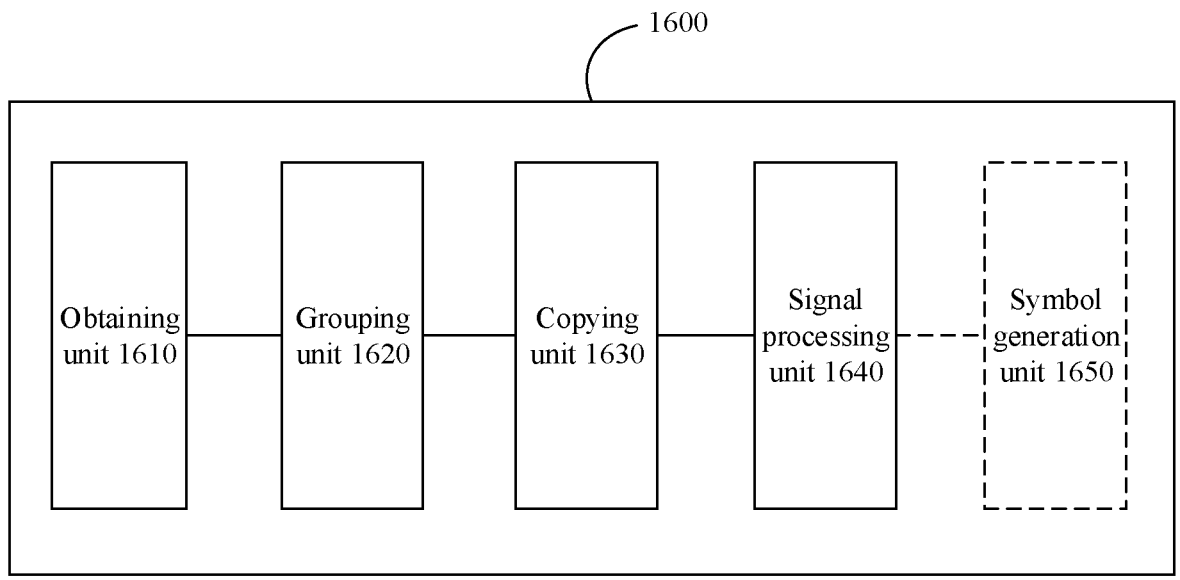
FIG. 16 is a diagram of a symbol processing apparatus according to an embodiment of this application.

FIG. 16 is a diagram of a symbol processing apparatus 1600 according to an embodiment of this application. The apparatus 1600 is configured to execute the foregoing method embodiments. The apparatus 1600 may include the following units:

an obtaining unit 1610, configured to obtain a plurality of complex-valued symbols;

a grouping unit 1620, configured to divide the plurality of complex-valued symbols into a plurality of sets, where each set corresponds to one transmitted symbol, the plurality of sets include a first set corresponding to a first transmitted symbol and a second set corresponding to a second transmitted symbol, the first transmitted symbol and the second transmitted symbol are consecutive in time domain, and the first transmitted symbol is located before the second transmitted symbol;

a copying unit 1630, configured to perform a copy operation on the first set and the second set, so that both the first set and the second set have first complex-valued symbols, where a time domain index of a start location of a first subset including the first complex-valued symbols in the first set is the same as a time domain index of a start location of a second subset including the first complex-valued symbols in the second set; and a signal processing unit 1640, configured to: after the copy operation, perform signal processing on the first set and the second set, where the signal processing includes a cyclic shift or frequency domain weighting, and through the signal processing, the start location of the first subset corresponds to a location preceding a first reference point of the first transmitted symbol, an end location of the first subset corresponds to a location following the first reference point of the first transmitted symbol, the start location of the second subset corresponds to a location preceding a second reference point of the second transmitted symbol, and an end location of the second subset corresponds to a location following the second reference point of the second transmitted symbol, where the first reference point represents an end location of a transmitted symbol, and the second reference point represents a location from which a CP is obtained through truncation in a transmitted symbol.

Optionally, in some embodiments, the signal processing unit 1640 is configured to: perform frequency domain processing on the first set and the second set to obtain a frequency domain signal corresponding to the first set and a frequency domain signal corresponding to the second set; perform IFFT on the frequency domain signal corresponding to the first set and the frequency domain signal corresponding to the second set, to obtain a time domain signal corresponding to the first set and a time domain signal corresponding to the second set; and perform a cyclic shift on the time domain signal corresponding to the first set and the time domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

Optionally, in some embodiments, the signal processing unit 1640 is configured to: perform DFT on the first set and the second set to obtain a frequency domain signal corresponding to the first set and a frequency domain signal corresponding to the second set; and perform frequency domain weighting on the frequency domain signal corresponding to the first set and the frequency domain signal corresponding to the second set, so that the start location of the first subset corresponds to the location preceding the first reference point of the first transmitted symbol, the end location of the first subset corresponds to the location following the first reference point of the first transmitted symbol, the start location of the second subset corresponds to the location preceding the second reference point of the second transmitted symbol, and the end location of the second subset corresponds to the location following the second reference point of the second transmitted symbol.

Optionally, in some embodiments, in the process in which the copying unit 1630 performs a copy operation on the first set and the second set, the time domain index of the start location of the first subset is related to a CP length and a symbol number.

Optionally, in some embodiments, in the process in which the copying unit 1630 performs a copy operation on the first set and the second set, the time domain index i of the start location of the first subset meets the following formula:

$$i = A + CL_{CP}(l), \text{ where}$$

l represents a symbol number of the first set, A represents a time domain index of a subset participating in a copy operation in a set whose symbol number l is 0, and $CL_{CP}(l)$ represents an equivalent cumulative CP length of the first set whose symbol number is l.

Optionally, in some embodiments, the copying unit 1630 is configured to copy the first complex-valued symbols in the first set into the second set.

Optionally, in this embodiment, the first transmitted symbol is a reference signal, and the second transmitted symbol is a non-reference signal.

Optionally, in some embodiments, the copying unit 1630 is configured to copy the first complex-valued symbols in the second set into the first set.

Optionally, in this embodiment, the first transmitted symbol is a non-reference signal, and the second transmitted symbol is a reference signal.

Optionally, in some embodiments, the apparatus 1600 further includes:

a symbol generation unit 1650, configured to generate the first transmitted symbol and the second transmitted symbol based on signals obtained through the cyclic shift, where a symbol component whose end location is the first reference point in the first transmitted symbol is the same as a symbol component whose end location is the second reference point in the second transmitted symbol.

Therefore, in this application, when a CP length is fixed, a guard interval between symbols can be flexibly configured, and a length of the guard interval can also be flexibly configured based on a user requirement.

Optionally, the obtaining unit 1610 may include a modulation subunit, configured to modulate an encoded bit stream to obtain a modulated symbol, where the modulated symbol may also be referred to as a complex-valued symbol.

Optionally, the obtaining unit 1610 is configured to obtain, based on a PTRS sampling point and the modulated symbol, a plurality of complex-valued symbols for processing by the grouping unit 1620.

Figure 17:
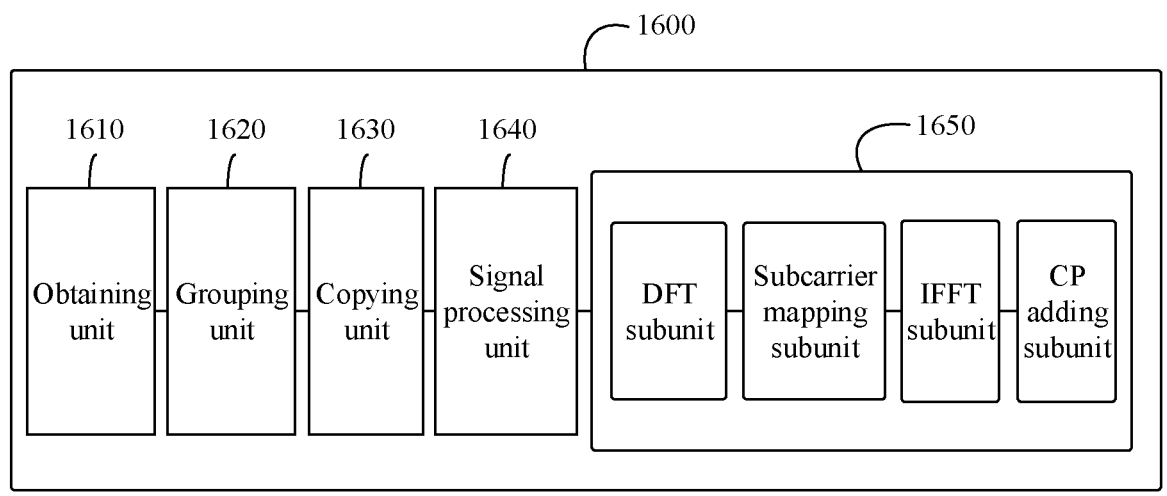
FIG. 17 is a diagram of a symbol processing apparatus according to an embodiment of this application.

Optionally, when the apparatus 1600 is applied to the application scenario 1, for example, as shown in FIG. 17, the symbol generation unit 1650 may include a DFT subunit, a subcarrier mapping subunit, an IFFT subunit, and a CP adding subunit.

In FIG. 17, the signal processing unit 1640 is located between the copying unit 1630 and the symbol generation unit 1650. In this case, the signal processing unit 1640 may be referred to as a cyclic shift unit.

Optionally, the signal processing unit 1640 may be located in the symbol generation unit 1650.

For example, the signal processing unit 1640 is located between the DFT subunit and the IFFT subunit. In this case, the signal processing unit 1640 may be referred to as a frequency domain weighting unit.

For another example, the signal processing unit 1640 is located between the IFFT subunit and the CP adding subunit. In this case, the signal processing unit 1640 may be referred to as a cyclic shift unit.

Figure 18:
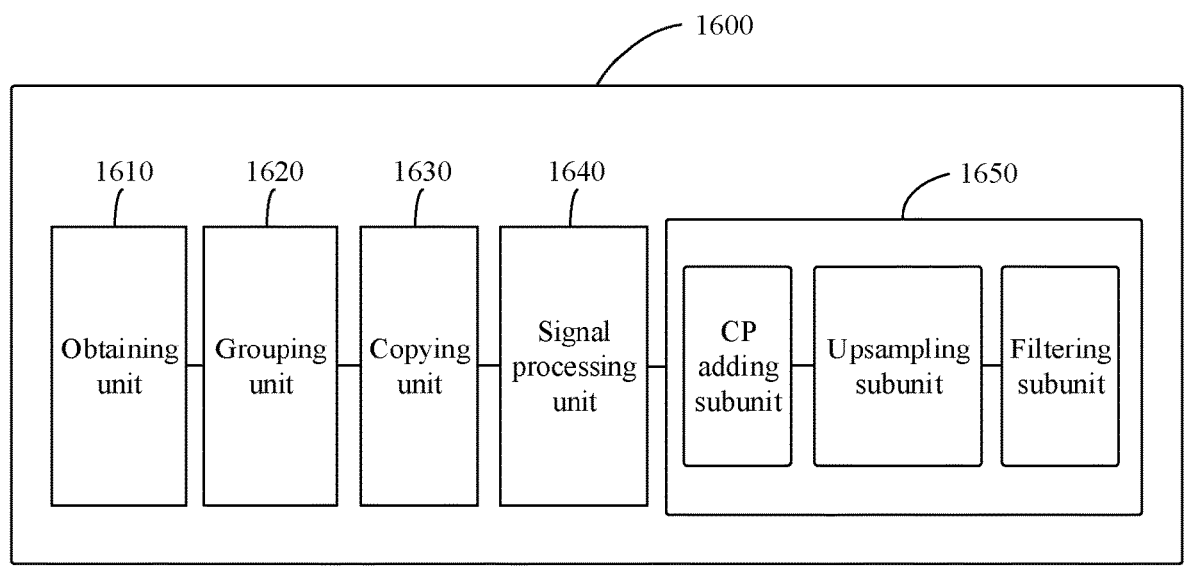
FIG. 18 is a diagram of a symbol processing apparatus according to an embodiment of this application.

Optionally, when the apparatus 1600 is applied to the application scenario 2, for example, as shown in FIG. 18, the symbol generation unit 1650 may include a CP adding subunit, an upsampling subunit, and a filtering subunit. In this case, the signal processing unit 1640 may be referred to as a cyclic shift unit.

Optionally, in another embodiment of the apparatus 1600, the obtaining unit 1610 is configured to obtain a plurality of complex-valued symbols. The grouping unit 1620 is configured to divide the plurality of complex-valued symbols into a plurality of sets, where the plurality of sets include a first set and a second set, the first set corresponds to a first transmitted symbol, the second set corresponds to a second transmitted symbol, the first transmitted symbol and the second transmitted symbol are consecutive in time domain, the first transmitted symbol is located before the second transmitted symbol, and complex-valued symbols in a first subset in the first set are the same as complex-valued symbols in a second subset in the second set. The signal processing unit 1640 is configured to perform signal processing on the first set and the second set, where the signal processing includes a cyclic shift or frequency domain weighting, and through the signal processing, a start location of the first subset corresponds to a location preceding a first reference point of the first transmitted symbol, an end location of the first subset corresponds to a location following the first reference point of the first transmitted symbol, a start location of the second subset corresponds to a location preceding a second reference point of the second transmitted symbol, and an end location of the second subset corresponds to a location following the second reference point of the second transmitted symbol, where the first reference point represents an end location of a transmitted symbol, and the second reference point represents a location from which a CP is obtained through truncation in a transmitted symbol.

Optionally, in this embodiment, both the first transmitted symbol and the second transmitted symbol are reference signals.

Optionally, the obtaining unit 1610, the grouping unit 1620, the copying unit 1630, and the signal processing unit 1640 (or the obtaining unit 1610, the grouping unit 1620, the copying unit 1630, the signal processing unit 1640, and the symbol generation unit 1650) may be implemented by using software, may be implemented by using hardware, or may be implemented by using hardware and software. In addition, the obtaining unit 1610, the grouping unit 1620, the copying unit 1630, and the signal processing unit 1640 (or the obtaining unit 1610, the grouping unit 1620, the copying unit 1630, the signal processing unit 1640, and the symbol generation unit 1650) may be different chips, or may be integrated into one chip or integrated circuit.

Optionally, in the foregoing embodiment, the obtaining unit 1610, the grouping unit 1620, the copying unit 1630, the signal processing unit 1640, and the symbol generation unit 1650 each may be implemented by using a processor or a related circuit of a processor.

Figure 19:
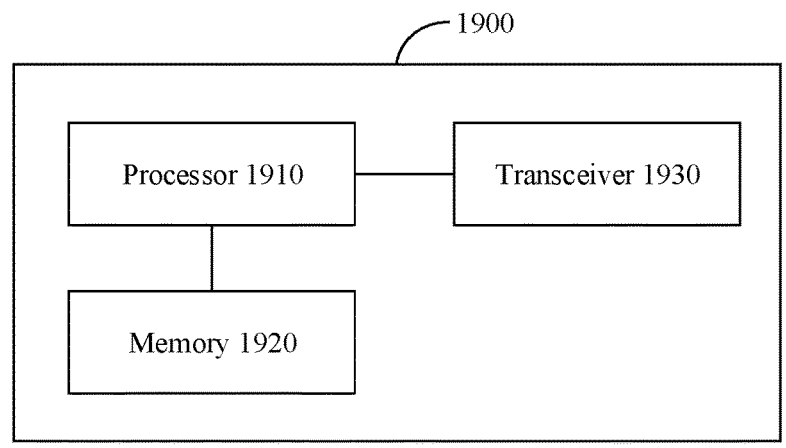
FIG. 19 is a diagram of a symbol processing apparatus according to an embodiment of this application.

As shown in FIG. 19, an embodiment of this application further provides a symbol processing apparatus 1900. The apparatus 1900 includes a processor 1910, a memory 1920, and a transceiver 1930. The memory 1920 stores a program, the processor 1910 is configured to execute the program stored in the memory 1920, and execution of the program stored in the memory 1920 enables the apparatus 1900 to execute the foregoing method embodiments.

An embodiment of this application further provides a communication apparatus. The communication apparatus may be a terminal device or a chip. The communication apparatus may be configured to execute the foregoing method embodiments.

Figure 20:
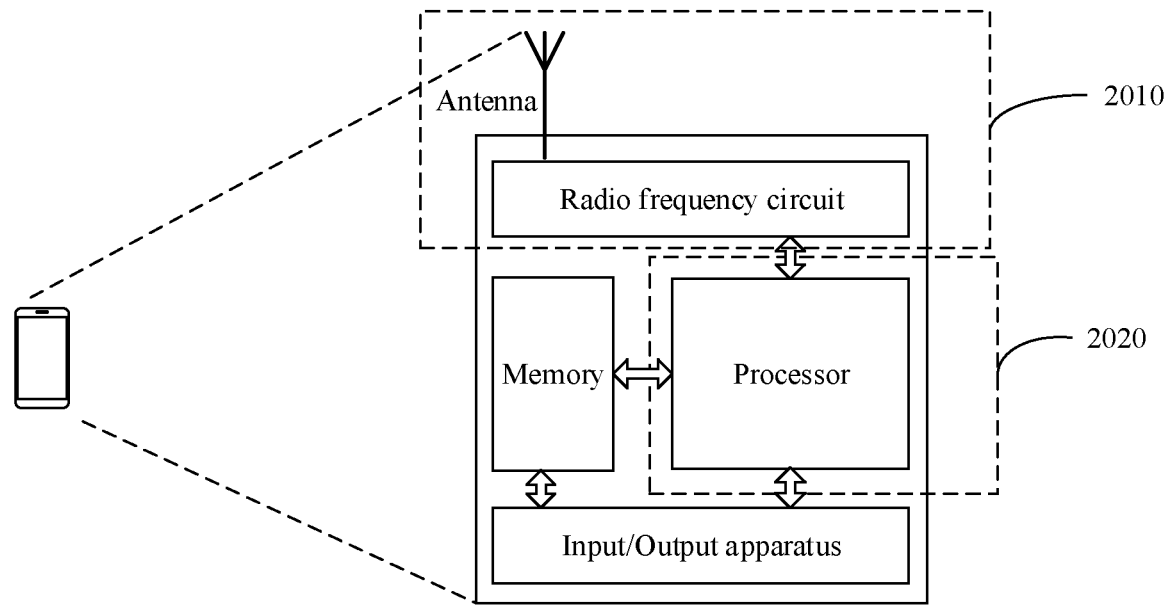
FIG. 20 is a diagram of a terminal device according to an embodiment of this application.

When the communication apparatus is a terminal device, FIG. 20 is a simplified diagram of a structure of the terminal device. For ease of understanding and illustration, an example in which the terminal device is a mobile phone is used in FIG. 20. As shown in FIG. 20, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 20 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 20, the terminal device includes a transceiver unit 2010 and a processing unit 2020. The transceiver unit 2010 may also be referred to as a transceiver, a transceiver machine, a transceiver apparatus, or the like. The processing unit 2020 may also be referred to as a processor, a processing board, a processing module, a processing apparatus, or the like. Optionally, a component that is in the transceiver unit 2010 and that is configured to implement a receiving function may be considered as a receiving unit, and a component that is in the transceiver unit 2010 and that is configured to implement a sending function may be considered as a sending unit. In other words, the transceiver unit 2010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the processing unit 2020 is configured to execute the foregoing method embodiments. The transceiver unit 2010 is configured to perform related receiving/sending operations in the foregoing method embodiments. For example, the transceiver unit 2010 is configured to send or receive a DFT-s-OFDM symbol or an SC-QAM symbol.

It should be understood that FIG. 20 is merely an example instead of a limitation. The terminal device including the transceiver unit and the processing unit may not depend on the structure shown in FIG. 20.

When the communication apparatus is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus. The communication apparatus may be a network device or a chip. The communication apparatus may be configured to execute the foregoing method embodiments. When the communication apparatus is a network device, for example, the communication apparatus is a base station.

Figure 21:
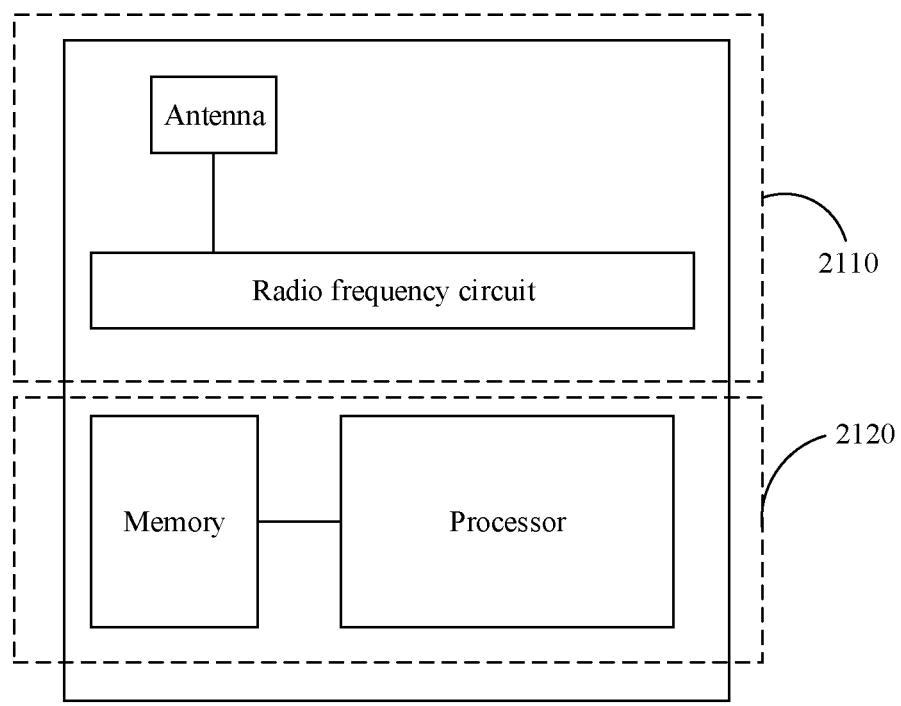
FIG. 21 is a diagram of a network device according to an embodiment of this application.

FIG. 21 is a simplified diagram of a structure of a base station. The base station includes a part 2110 and a part 2120. The part 2110 is mainly configured to: receive and send a radio frequency signal, and perform conversion between a radio frequency signal and a baseband signal. The part 2120 is mainly configured to: perform baseband processing, control the base station, and the like. The part 2110 may be usually referred to as a transceiver unit, a transceiver machine, a transceiver circuit, a transceiver, or the like. The part 2120 is usually a control center of the base station, and may be usually referred to as a processing unit, and is configured to control the base station to perform a processing operation on the network device side in the foregoing method embodiments.

The transceiver unit in the part 2110 may also be referred to as a transceiver machine, a transceiver, or the like. The transceiver unit includes an antenna and a radio frequency unit. The radio frequency unit is mainly configured to perform radio frequency processing. Optionally, a component that is in the part 2110 and that is configured to implement a receiving function may be considered as a receiving unit, and a component that is configured to implement a sending function may be considered as a sending unit. In other words, the part 2110 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2120 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 2120 is configured to execute the foregoing method embodiments. The part 2110 is configured to perform related receiving/sending operations in the foregoing method embodiments. For example, the part 2110 is configured to send or receive a DFT-s-OFDM symbol or an SC-QAM symbol.

It should be understood that FIG. 21 is merely an example instead of a limitation. The network device including the transceiver unit and the processing unit may not depend on the structure shown in FIG. 21.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

The terminal device in the embodiments of this application includes a handheld device, a vehicle-mounted device, a wearable device, or a computing device that has a wireless communication function. The terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone (mobile phone), a tablet computer, or a computer that has a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. The terminal device may be a terminal device in a 5G network, a terminal device in a future evolved public land mobile network (PLMN), or the like.

The network device in the embodiments of this application may be configured to communicate with one or more terminal devices, or may be configured to communicate with one or more base stations that have some terminal functions (for example, communication between a macro base station and a micro base station, such as an access point). The network device may be referred to as a base station. The base station may be in a plurality of forms, for example, a macro base station, a micro base station, a relay station, and an access point. For example, the network device in the embodiments of this application may be a base station in NR, a base transceiver station (BTS) in a global system for mobile communications (GSM) or code division multiple access (CDMA), a NodeB (NB) in a wideband code division multiple access (WCDMA) system, or an evolved NodeB (eNB or eNodeB) in an LTE system. The base station in 5G NR may also be referred to as a transmission reception point (TRP) or a next generation NodeB (gNB).

An embodiment of this application further provides a computer-readable storage medium. The computer-readable storage medium stores a computer program. When the computer program is executed by a computer, the computer is enabled to implement the method in the foregoing method embodiments.

An embodiment of this application further provides a computer program product including instructions. When the instructions are executed by a computer, the computer is enabled to implement the method in the foregoing method embodiments.

For explanations and beneficial effects of related content of any of the communication apparatuses provided above, refer to the corresponding method embodiments provided above. Details are not described herein again.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in the embodiments of this application is not limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or by a function module, in the terminal device or network device, that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

It should be understood that, the processor mentioned in the embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an EPROM, an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiments described above are merely examples. For example, division into the units is merely logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely implementations of this application and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A symbol processing method, comprising:
   obtaining a plurality of complex-valued symbols;
   dividing the plurality of complex-valued symbols into a plurality of sets, the plurality of sets comprise a first set corresponding to a first transmitted symbol and a second set corresponding to a second transmitted symbol, the first transmitted symbol and the second transmitted symbol are consecutive in a time domain, and the first transmitted symbol is located before the second transmitted symbol;
   performing a copy operation on the first set and the second set, so that both the first set and the second set have first complex-valued symbols, a time domain index of a first subset start location of a first subset including the first complex-valued symbols in the first set is the same as a time domain index of a second subset start location of a second subset including the first complex-valued symbols in the second set; and
   after the copy operation, performing signal processing on the first set and the second set, the signal processing comprising a cyclic shift or frequency domain weighting, and after the signal processing, the first subset start location corresponds to a location preceding a first reference point of the first transmitted symbol, a first subset end location of the first subset corresponds to a location following the first reference point of the first transmitted symbol, the second subset start location corresponds to a location preceding a second reference point of the second transmitted symbol and a second subset end location of the second subset corresponds to a location following the second reference point of the second transmitted symbol;
   wherein the first reference point represents a transmitted symbol end location of a transmitted symbol and the second reference point represents a cyclic prefix location from which a cyclic prefix is obtained through truncation in a transmitted symbol.

2. The method according to claim 1, wherein the performing the signal processing on the first set and the second set, wherein the signal processing comprises a cyclic shift or frequency domain weighting, comprises:
   performing frequency domain processing on the first set and the second set to obtain a first set frequency domain signal corresponding to the first set and a second set frequency domain signal corresponding to the second set;
   performing an inverse fast Fourier transform (IFFT) on the first set frequency domain signal and the second set frequency domain signal to obtain a first set time domain signal corresponding to the first set and a second set time domain signal corresponding to the second set; and performing a cyclic shift on the first set time domain signal and on the second set time domain signal so that the first subset start location corresponds to the location preceding the first reference point of the first transmitted symbol, the first subset end location corresponds to the location following the first reference point of the first transmitted symbol, the second subset start location corresponds to the location preceding the second reference point of the second transmitted symbol, and the second subset end location corresponds to the location following the second reference point of the second transmitted symbol.

3. The method according to claim 1, wherein the performing the signal processing on the first set and the second set and the signal processing comprises a cyclic shift or frequency domain weighting comprises:

performing a discrete Fourier transform (DFT) on the first set and the second set to obtain a first set frequency domain signal corresponding to the first set and obtain a second set frequency domain signal corresponding to the second set; and performing frequency domain weighting on the first set frequency domain signal and on the second set frequency domain signal so that the first subset start location corresponds to the location preceding the first reference point of the first transmitted symbol, the first subset end location corresponds to the location following the first reference point of the first transmitted symbol, the second subset start location corresponds to the location preceding the second reference point of the second transmitted symbol, and the second subset end location corresponds to the location following the second reference point of the second transmitted symbol.

4. The method according to claim 1, wherein the time domain index of the start location of the first subset is related to a cyclic prefix length and a symbol number.

5. The method according to claim 4, wherein the time domain index i of the start location of the first subset meets the formula $i=A+CL_{CP}(l)$, wherein l represents a symbol number of the first set, A represents a time domain index of a subset participating in a copy operation in a set whose symbol number l is 0, and $CL_{CP}(l)$ represents an equivalent cumulative CP length of the first set whose symbol number is l.

6. The method according to claim 1, wherein the performing the copy operation on the first set and the second set comprises:

copying the first complex-valued symbols in the first set into the second set.

7. The method according to claim 1, wherein the performing a copy operation on the first set and the second set comprises:

copying the first complex-valued symbols in the second set into the first set.

8. The method according to claim 6, wherein the first transmitted symbol is a reference signal and the second transmitted symbol is a non-reference signal.

9. The method according to claim 7, wherein the first transmitted symbol is a non-reference signal, and the second transmitted symbol is a reference signal.

10. The method according to claim 1, wherein the method further comprises:

generating the first transmitted symbol and the second transmitted symbol based on signals obtained through the signal processing;

wherein the first subset corresponds to a first symbol component of the first transmitted symbol, the second subset corresponds to a second symbol component of the second transmitted symbol, and the first symbol component is the same as the second symbol component.

11. A symbol processing method, comprising:

obtaining a plurality of complex-valued symbols;

dividing the plurality of complex-valued symbols into a plurality of sets, wherein the plurality of sets comprise a first set and a second set, the first set corresponds to a first transmitted symbol, the second set corresponds to a second transmitted symbol, the first transmitted symbol and the second transmitted symbol are consecutive in a time domain, the first transmitted symbol is located before the second transmitted symbol, and complex-valued symbols in a first subset in the first set are the same as complex-valued symbols in a second subset in the second set; and performing signal processing on the first set and the second set, the signal processing comprising a cyclic shift or frequency domain weighting, and after the signal processing, a first subset start location of the first subset corresponds to a location preceding a first reference point of the first transmitted symbol, a first subset end location of the first subset corresponds to a location following the first reference point of the first transmitted symbol, a second subset start location of the second subset corresponds to a location preceding a second reference point of the second transmitted symbol, and a second subset end location of the second subset corresponds to a location following the second reference point of the second transmitted symbol;

wherein the first reference point represents an end location of a transmitted symbol and the second reference point represents a cyclic prefix location from which a cyclic prefix is obtained through truncation in a transmitted symbol.

12. The method according to claim 11, wherein both the first transmitted symbol and the second transmitted symbol are demodulation reference signals.

13. A symbol processing apparatus, comprising:

an obtaining unit configured to obtain a plurality of complex-valued symbols;

a grouping unit configured to divide the plurality of complex-valued symbols into a plurality of sets, the plurality of sets comprise a first set corresponding to a first transmitted symbol and a second set corresponding to a second transmitted symbol, the first transmitted symbol and the second transmitted symbol are consecutive in a time domain and the first transmitted symbol is located before the second transmitted symbol;

a copying unit configured to perform a copy operation on the first set and the second set so that both the first set and the second set have first complex-valued symbols, a time domain index of a first subset start location of a first subset including the first complex-valued symbols in the first set is the same as a time domain index of a second subset start location of a second subset including the first complex-valued symbols in the second set; and a signal processing unit configured to perform signal processing on the first set and the second set after the copy operation, the signal processing comprising a cyclic shift or frequency domain weighting, and after the signal processing, the first subset start location corresponds to a location preceding a first reference point of the first transmitted symbol, a first subset end location of the first subset corresponds to a location following the first reference point of the first transmitted symbol, the second subset start location corresponds to a location preceding a second reference point of the second transmitted symbol, and a second subset end location of the second subset corresponds to a location following the second reference point of the second transmitted symbol;

wherein the first reference point represents an end location of a transmitted symbol and the second reference point represents a cyclic prefix location from which a cyclic prefix is obtained through truncation in a transmitted symbol.

14. The apparatus according to claim 13, wherein the signal processing unit is further configured to:
perform frequency domain processing on the first set and the second set to obtain a first set frequency domain signal corresponding to the first set and a second set frequency domain signal corresponding to the second set;
perform an inverse fast Fourier transform (IFFT) on the first set frequency domain signal and on the second set frequency domain signal to obtain a first set time domain signal corresponding to the first set and a second set time domain signal corresponding to the second set; and
perform a cyclic shift on the first set time domain signal and on the second set time domain signal so that the first subset start location corresponds to the location preceding the first reference point of the first transmitted symbol, the first subset end location of the first subset corresponds to the location following the first reference point of the first transmitted symbol, the second subset start location of the second subset corresponds to the location preceding the second reference point of the second transmitted symbol, and the second subset end location of the second subset corresponds to the location following the second reference point of the second transmitted symbol.

15. The apparatus according to claim 13, wherein the signal processing unit is further configured to:
perform a discrete Fourier transform (DFT) on the first set and on the second set to obtain a first set frequency domain signal corresponding to the first set and a second set frequency domain signal corresponding to the second set; and
perform frequency domain weighting on the first set frequency domain signal and the second set frequency domain signal so that the first subset start location corresponds to the location preceding the first reference point of the first transmitted symbol, the first subset end location corresponds to the location following the first reference point of the first transmitted symbol, the second subset start location corresponds to the location preceding the second reference point of the second transmitted symbol, and the second subset end location of the second subset corresponds to the location following the second reference point of the second transmitted symbol.

16. The apparatus according to claim 13, wherein the time domain index of the first subset start location is related to a cyclic prefix length and a symbol number.

17. The apparatus according to claim 16, wherein the time domain index i of the start location of the first subset meets the formula $i = A + CL_{CP}(l)$, wherein l represents a symbol number of the first set, A represents a time domain index of a subset participating in a copy operation in a set whose symbol number l is 0, and $CL_{CP}(l)$ represents an equivalent cumulative CP length of the first set whose symbol number is l.

18. The apparatus according to claim 13, wherein the copying unit is further configured to copy the first complex-valued symbols in the first set into the second set.

19. The apparatus according to claim 13, wherein the copying unit is further configured to copy the first complex-valued symbols in the second set into the first set.

20. The apparatus according to claim 18, wherein the first transmitted symbol is a reference signal and the second transmitted symbol is a non-reference signal.

* * * * *